United States Patent [19]
Lynn et al.

[11] 3,883,235
[45] *May 13, 1975

[54] AUTOMATIC VISUAL FIELD EXAMINATION INCLUDING FIXATION MONITORING COMPENSATION

[76] Inventors: John R. Lynn, 10001 Preston Rd., Dallas, Tex. 75230; George W. Tate, Jr., 4323 Brown Apt. 243, Dallas, Tex. 75219

[*] Notice: The portion of the term of this patent subsequent to Feb. 27, 1990 has been disclaimed.

[22] Filed: Feb. 26, 1973

[21] Appl. No.: 335,572

Related U.S. Application Data

[63] Continuation-in-part of Ser. No. 181,538, Sept. 17, 1971, Pat. No. 3,718,386.

[52] U.S. Cl. ............................................. 351/39
[51] Int. Cl. ............................................. A61b 3/02
[58] Field of Search .......... 351/6, 7, 23, 24, 36, 37, 351/39

[56] References Cited
UNITED STATES PATENTS

| | | | |
|---|---|---|---|
| 1,942,850 | 1/1934 | Tillyer | 351/24 |
| 2,374,854 | 5/1945 | Feinbloom | 351/24 |
| 3,317,268 | 5/1967 | Oswold | 351/23 X |
| 3,416,857 | 12/1968 | Lookabaugh | 351/39 X |
| 3,421,498 | 1/1969 | Gans | 351/24 X |
| 3,450,466 | 6/1969 | Streismyer | 351/39 X |
| 3,664,732 | 5/1972 | Lynn | 351/23 X |
| 3,718,386 | 2/1973 | Lynn et al. | 351/23 X |

OTHER PUBLICATIONS

Deugn, April 1959, pages 24–30 "On the Line of Sight".

*Primary Examiner*—Paul A. Sacher
*Attorney, Agent, or Firm*—Clegg, Cantrell & Crisman

[57] ABSTRACT

An illustrative embodiment of the present invention includes method and apparatus for determining locations in a test field at which a subject is able to perceive visual stimuli. The stimuli are presented on a test screen under control of a programmed automatic data processing system. The subject communicates with the data processing equipment via a subject response device and the system interprets the responses to alter the stimulus presentation regime dynamically while communicating feedback to the subject of correct or incorrect perception of each stimulus. Eye movement of the subject is monitored and compensated for in the presentation of the stimuli by other system apparatus which also communicates with the data processing equipment to continuously center the test field relative to the direction of gaze of the subject (which may not necessarily be the center of the test screen or a fixed point).

39 Claims, 37 Drawing Figures

REGISTRY OF RETINAL IMAGE AND DISPLAY SCREEN WITH FIXATION POINT AT CENTER OF SCREEN

REGISTRY OF RETINAL IMAGE AND DISPLAY SCREEN WITH SHIFTED FIXATION POINT

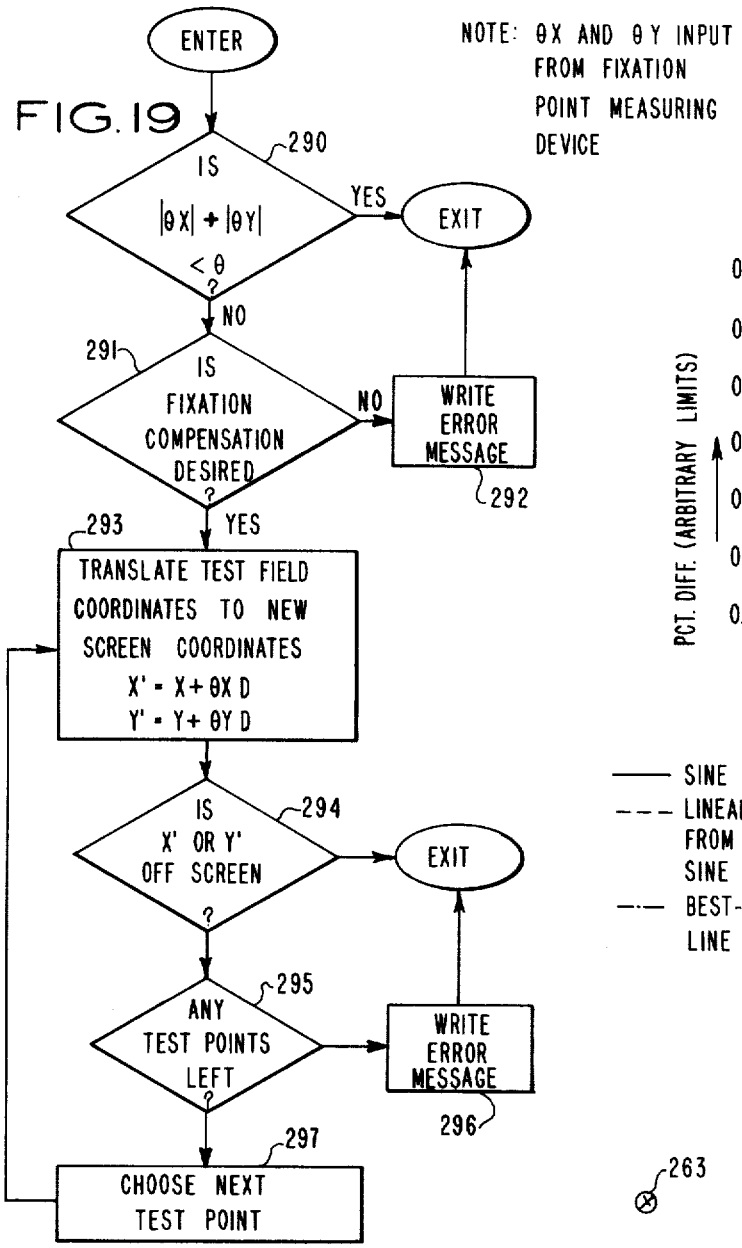
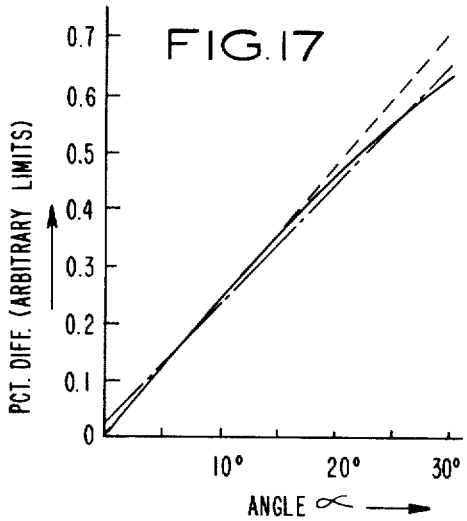
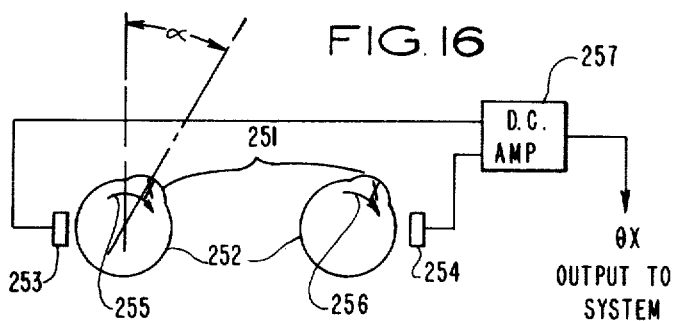

AUTOMATIC VISUAL FIELD EXAMINATION INCLUDING FIXATION MONITORING COMPENSATION

This application is a continuation-in-part of application, Ser. No. 181,538, filed Sept. 17, 1971, now U.S. Pat. No. 3,718,386.

BACKGROUND OF THE INVENTION

This invention relates to examination of the field of vision of a human patient and more particularly to automatically implemented methods and apparatus for examining the visual field of a human patient utilizing the principles of perimetry and campimetry.

The visual field of a subject or patient may be defined as the family of solid angles in which the patient may observe a given set of graded stimuli while his gaze is fixed at a point in space. More generally, if the fixed point in space just referred to (direction of gaze or fixation point) moves, then the visual field may be thought of as the family of solid angles in which a subject may observe a given set of graded stimuli at the instant that his gaze is directed at a particular point. Thus, the visual field remains essentially constant relative to any fixation point regardless of the direction of gaze of the subject if all other conditions are the same and extraneous artefacts such as the nose and the brow are ignored. Each solid angle or cone shaped section of space contained in this family is a function of the stimulus value as determined by the spot size and the hue and luminance (color and brightnes) of the spot of light relative to the hue and luminance of the background (contrast) condition of the subject's visual system and his psychological state. In a normal person a maximum stimulus may be seen over a lateral expanse of roughly 216° using both eyes, or 170° using a single eye. The methods of the present invention are concerned with measuring the visual field of a single eye.

Visual fields are important in the detection and diagnosis of diseases which affect the brain and the visual system. For this reason visual fields are important to ophthamologists, neurosurgeons or other specialists who deal with these diseases. Visual fields also are of interest and use to the general practitioner in the management of diseases such as diabetes. In fact, all seven of the major causes of organic blindness in the United States (Glaucoma, Cataract, Diabetes, and other vascular diseases, Uveitis, Retinal detachment and Senilie macular degeneration), have characteristic patterns of defect in the visual field. Measurements of the visual field of a patient which are highly reproduceable from time to time in an objective manner are very valuable in detecting the progression of the above diseases and may be useful in determining the location of other physical defects such as pituitary tumors.

Visual fields have, in the past, been displayed by the use of isopter lines or lines of constant visual sensitivity which are drawn from the results of a manually conducted test. Manual testing which has been conducted in the prior art has usually been of two types, the kinetic and static methods. In both types, the steady gaze of the subect at a fixation point, generally located in the center of the test field, has been required. In the kinetic method, spots or stimuli of a known size and brightness are moved inwardly from beyond the edge of the peripheral vision of the patient until the subject signals in some manner to the examiner that he sees them. This method, while relatively fast, introduces a source of inaccuracy because of the reaction time lag between the subject's seeing the stimulus and his signal to the examiner.

The static method of manual visual field testing has utilized stationary stimuli displayed at fixed points relative to the fixation point of the subject in the visual field. Starting and remaining at such a point, and initially utilizing an imperceptible stimulus value, the size and/or brightness of the stimuli are increased in steps with intervening pauses until the subject signals the perception of the most recent brightest stimulus. This establishes a threshold value at the test point selected, and the procedure is extended to a number of other selected locations in the visual field where the process again determines the stimulus which may just be seen. This method generally produces more accurate results than the kinetic method but has the disadvantage of requiring a relatively longer time to conduct a complete test. Moreover, the repetitive presentation of static stimuli in the same relative location in the visual field without adequate intervening pauses or, worse yet, the gradual brightening of a continuously presented stimulus will cause localized bleaching of the retinal pigment and/or neural accommodation in the retinal area where the test spot is focused. This process, called local adaptation, may be avoided by delaying tests at the same retinal location until the eye has had time to recover from the previous test. A sequential display of stimuli at different fixed visual field locations eliminates this error source.

Due to the relatively long duration of the visual field test, the patient may lose interest and shift his gaze from the point of fixation. In previous testing methods this has reoriented the visual field and led to spurious test results as the test results are based upon an assumption that a single point of fixation was maintained as each stimulus was presented. Test results are merely deleted if the examiner become aware that the subject is not maintaining fixation. The present invention, however, by use of novel test methods and apparatus, monitors the orientation of the eye and presents test points reoriented to remain in the same relative position within the subject's visual field even if the gaze is shifted. The novel test system of the present invention feeds back information to the subject indicating a correct or incorrect response to a given stimulus while at the same time dynamically altering the presentation of stimuli to the subject in response to his reaction to previous stimuli.

With the present invention, inadvertent suggestion by the examiner is avoided through the pseudo random or unpredictable presentation of test stimuli at various locations in the visual field of a subject. This contributes markedly to the objectivity and reproducibility of the testing procedure. The unpredictable presentation of test stimuli at relatively random locations in the visual field reduces the anxiety of the patient and maintains his interest. Time consuming rest periods which are necessary to counteract local adaptation of the retina are also avoided.

Accordingly, it is an object of the present invention to provide a method of examining the visual field of a subject which is implemented by automatic data processing equipment in combination with stimuli producing apparatus and apparatus for monitoring the direction of gaze of a subject.

Another object of the present invention is to provide an automatic method and apparatus for determining the visual field of a subject which is faster and more objective than methods known in the prior art and which is not affected by a change in the patient's direction of gaze.

A still further object of the present invention is to provide method and apparatus for determining the visual field of a patient whose direction of gaze may be changing during the test and recording the visual field in a form useful to the medical profession.

In accordance with the objects of the present invention, method and apparatus are provided for determining and recording the visual field of a subject while monitoring and compensating for eye movement. The method, which is implemented by programmable automatic data processing equipment utilized in conjunction with peripheral testing equipment, is capable of producing accurate and reproducible results.

In one embodiment of the invention, a computer program is utilized to control the position, size, color and intensity of test stimuli which are presented at predetermined locations in the visual field of the subject by appropriate peripheral equipment. The program determines the threshold level of a stimulus which the subject may detect at a given point in his visual field by presenting such stimuli of computed intensity to the subject at pseudo random or unpredictable locations against a background field of substantially constant color and intensity. Eye movement of the subject is monitored and the relative location of the test points on the background field is dynamically altered to take into account a coordinate translation of the fixation point of the subject caused by eye movement. Movement of the head, excessive movement of the eye or blinking is detected to permit momentary interruption of the test.

The subject responds to the stimuli presented in the test field by indicating the relative position within his visual field at which a stimulus was seen. A manual response device, which may be referred to as a joystick, and which has two degrees of freedom is used to indicate the angular sector of the visual field in which the subject observed the stimulus. The subject's response to a given stimulus is used in the system to control the size and intensity of subsequent stimuli presented at the same geometrical location in his visual field. This is done in such a manner that the threshold level of the subject at a given geometrical location within the visual field is determined in an efficient manner and with an alacrity not previously possible using manual tests.

In this manner visual field tests are conducted at any suitable number of points in a subject's visual field to allow an accurate determination of the shape of the visual field even as the fixation point of the subject changes. After all test points in the visual field have been examined, the system records or displays the output data in a form convenient for the use of the medical profession. Such output may comprise, for example, visual field maps having isopter or constant threshold lines.

In another embodiment of the inventin, test stimuli are presented on the test field generally outside the visual field of the subject and then moved, under control of the automatic data processing equipment, toward the fixation point or some other fixed point in the test field. Eye movement of the subject is monitored, as before, and the relative location of the stimulus on the background field is dynamically altered to take into account translation of the fixation point of the subject caused by eye movement. The joystick is again used to indicate the angular sector of the visual field in which a stimulus is observed and also the time at which the stimulus moved into the subject's visual field. From this latter indication, the system determines the location on the test field at which the stimulus was first perceived. After a sufficient number of such locations has been identified, the locations can be used to construct one of the isopters which collectively define the subject's visual field.

The novel features of the present invention are set forth with particularity in the appended claims. The present invention, both as to its organization and manner of operation, together with further objects and advantages thereof may best be understood by way of illustration and example, when taken in conjunction with the accompanying drawings, in which:

Figure 3:
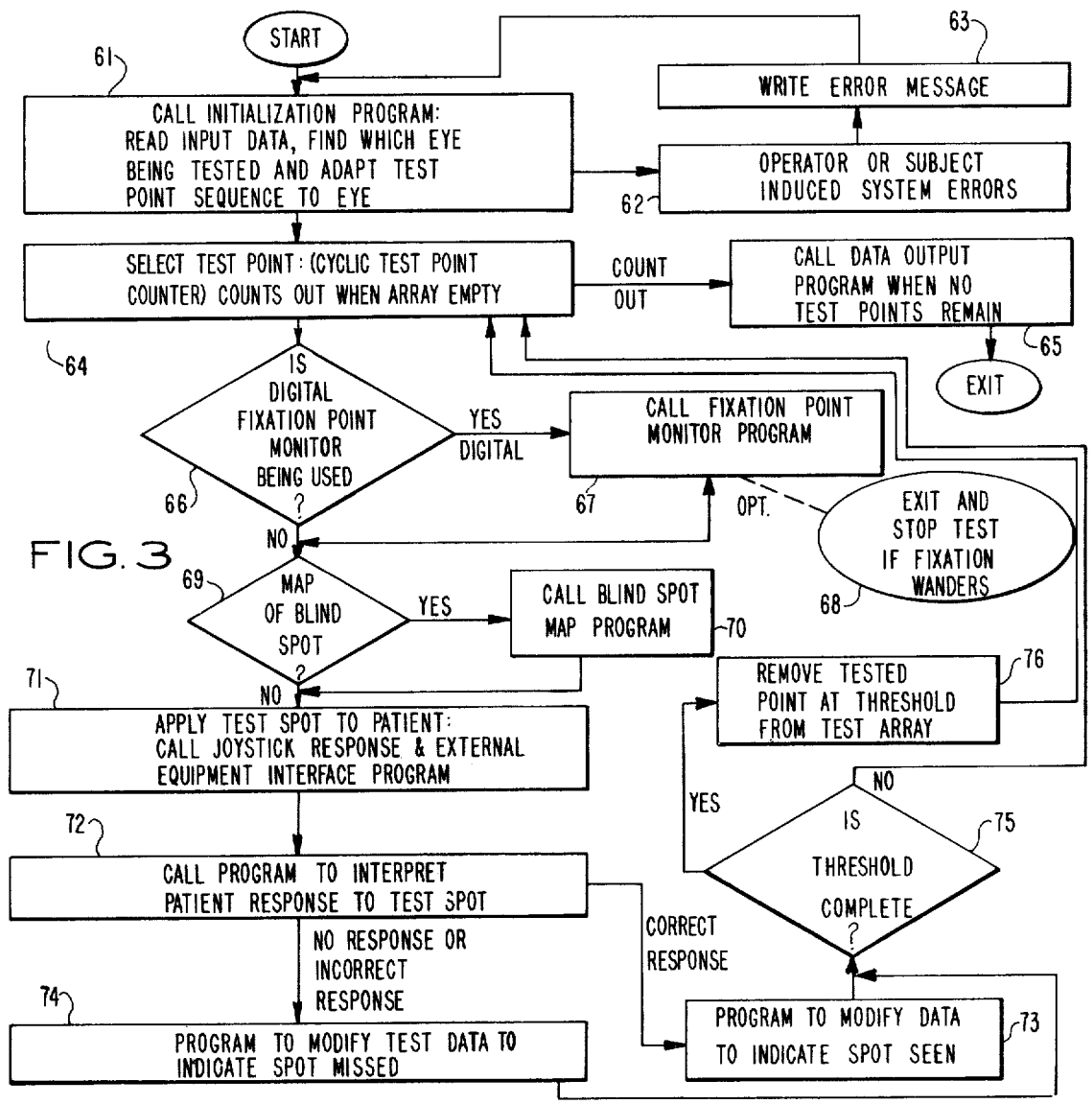
Figure 4:
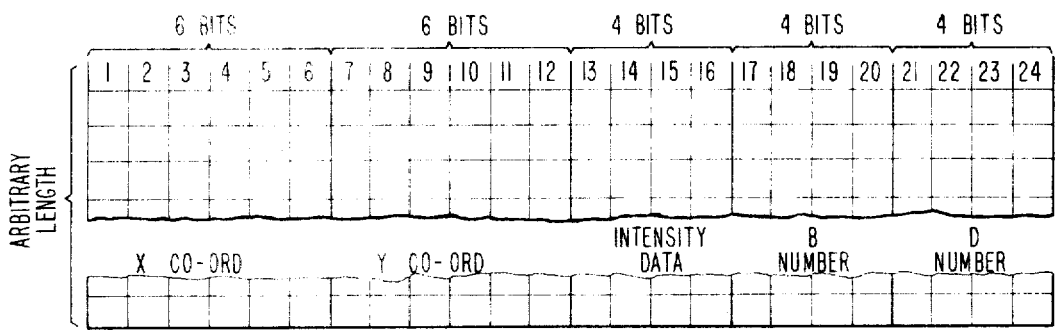
Figure 5:
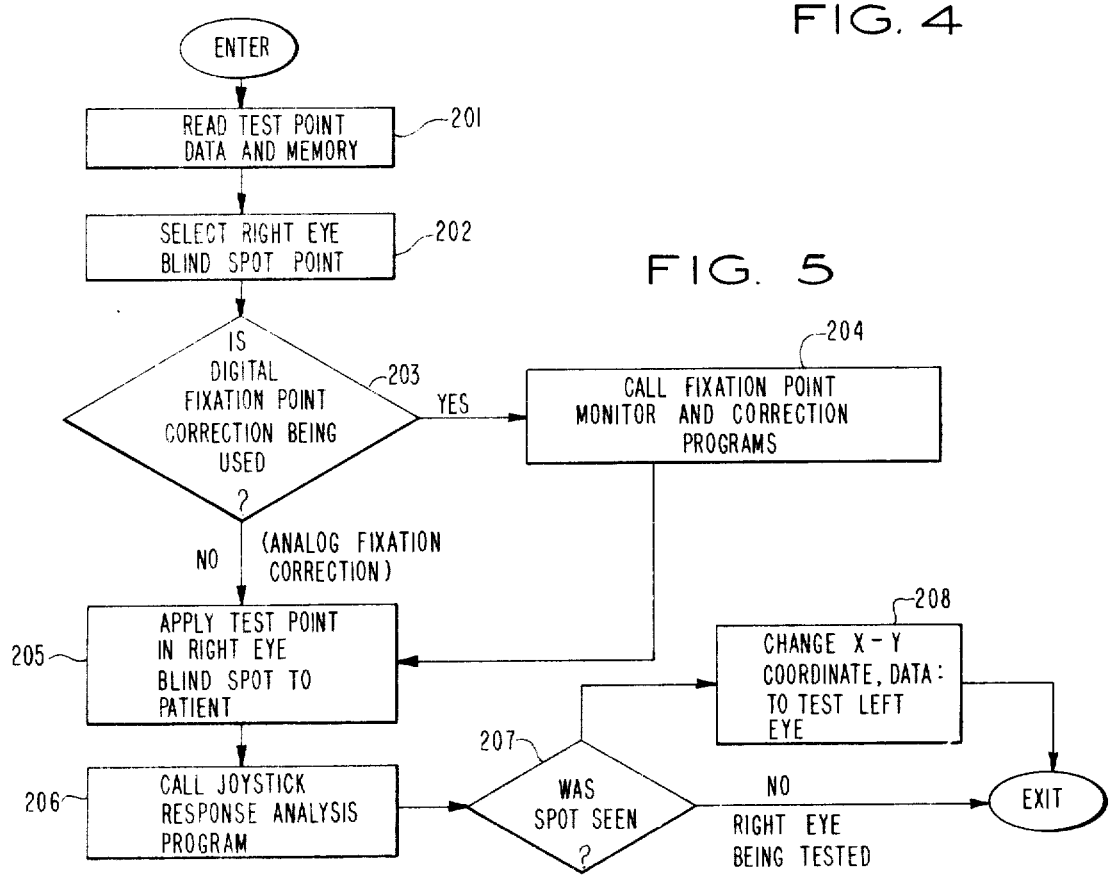
Figure 11:
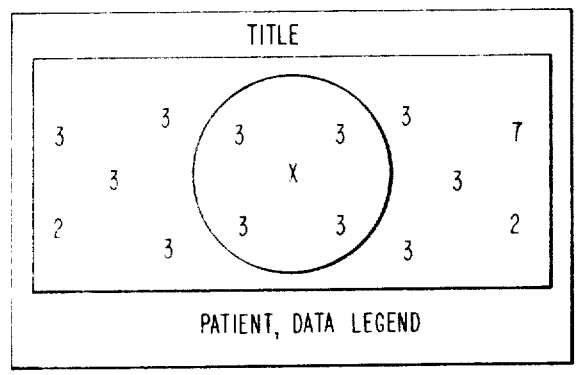
Figure 6:
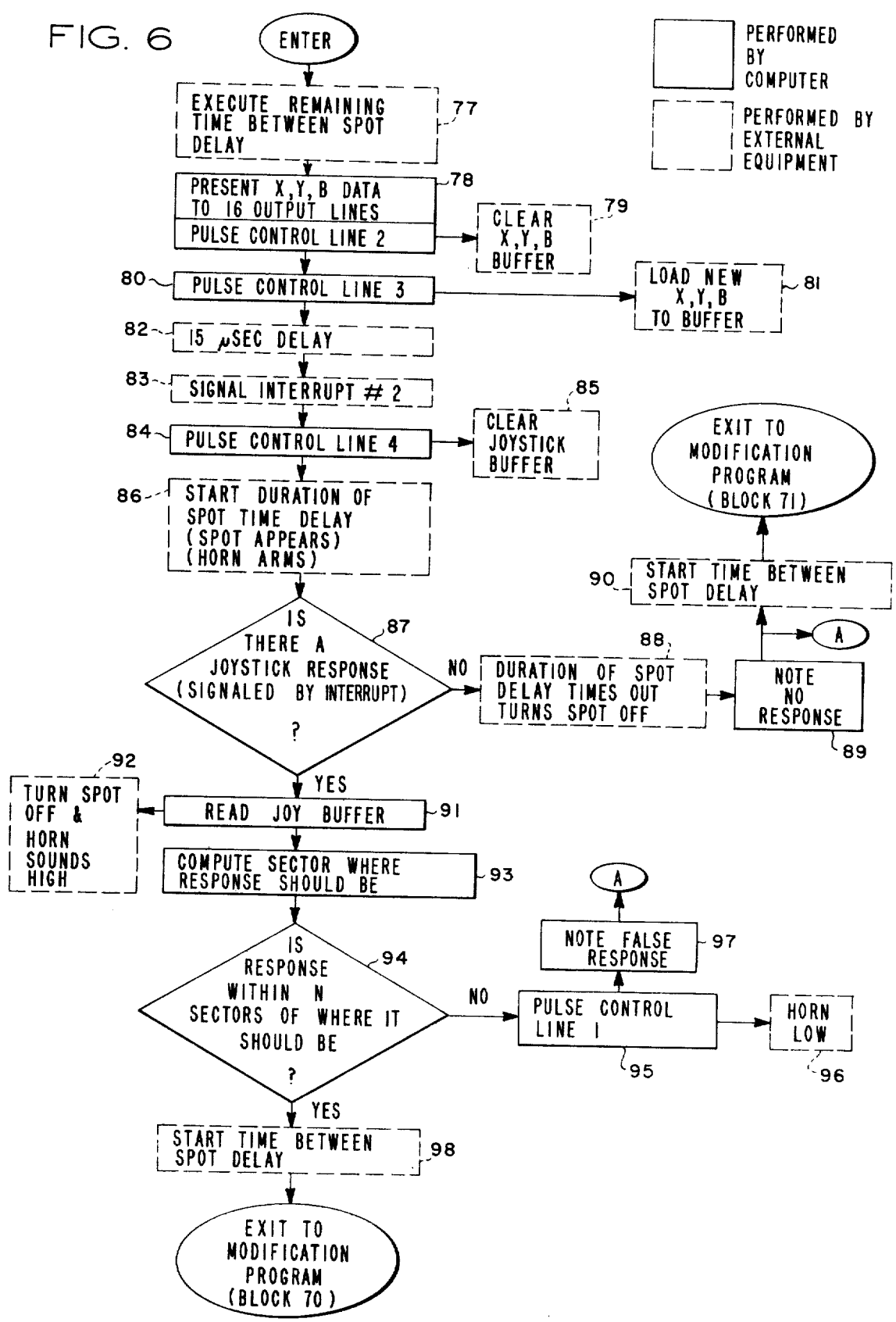
Figure 7:
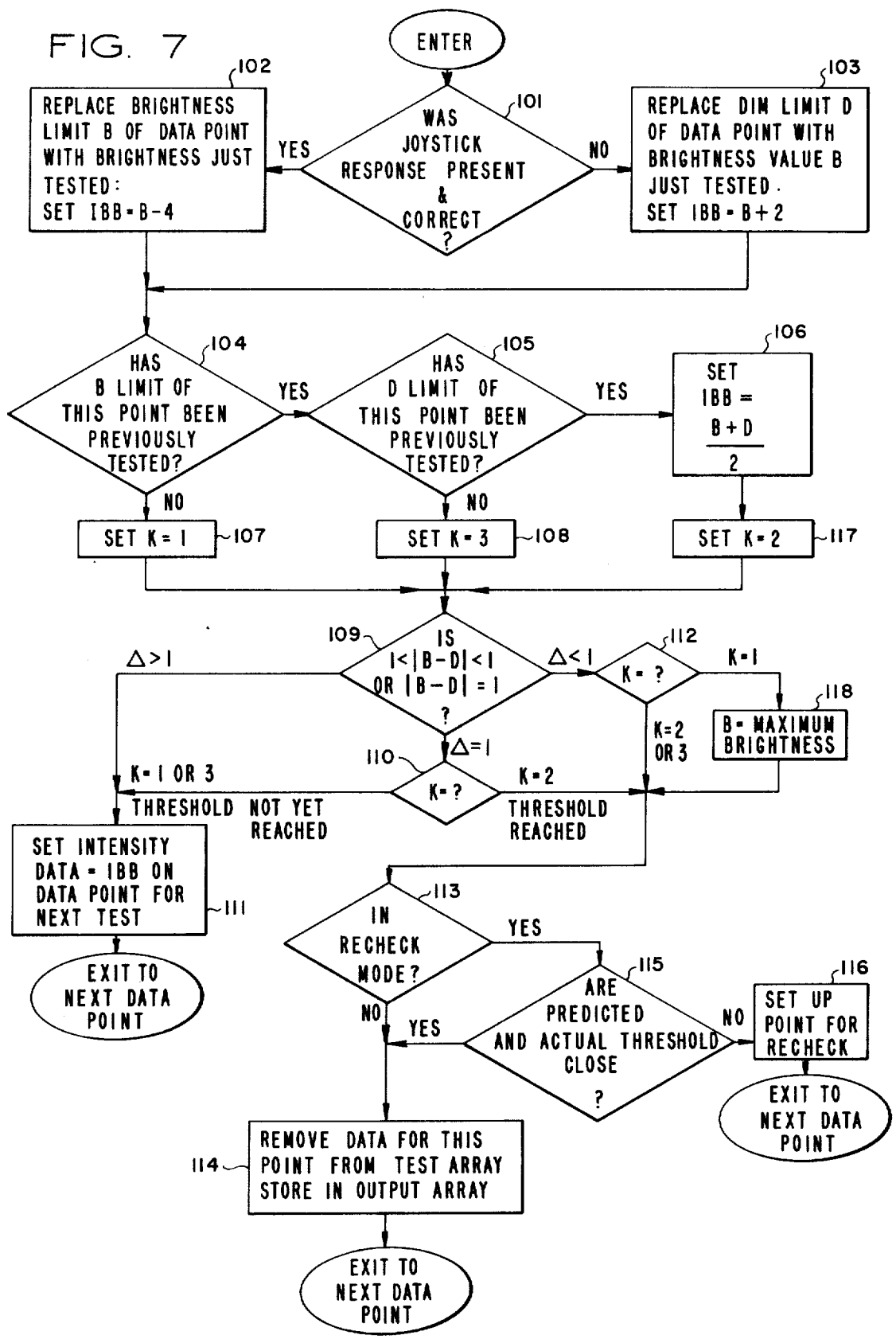
Figure 8:
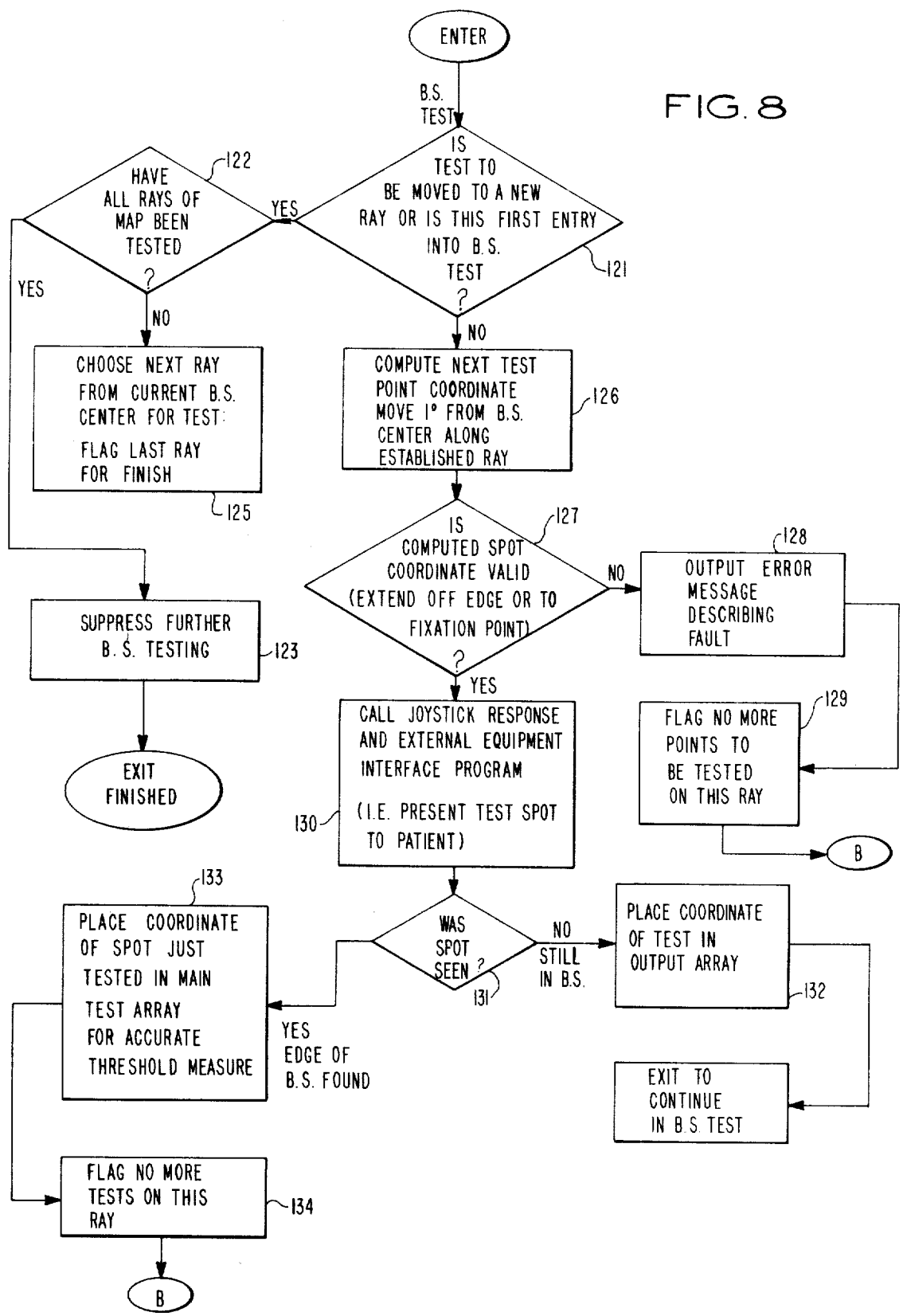
Figure 8A:
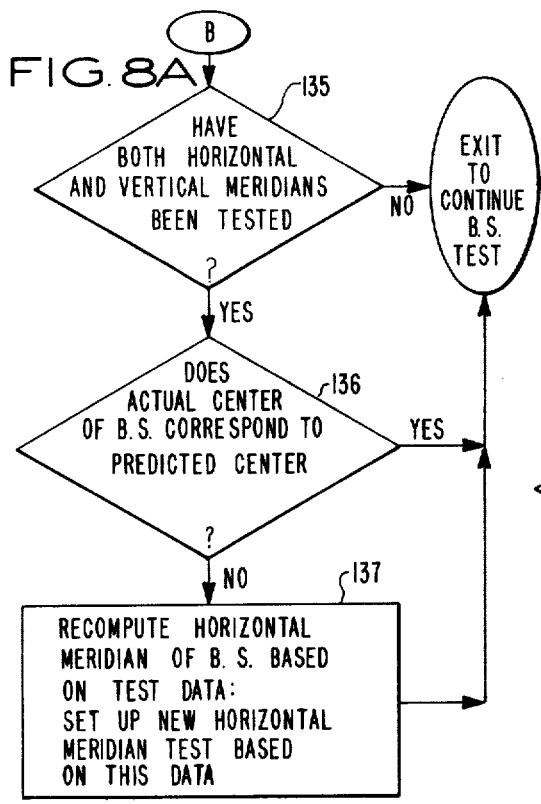
Figure 10:
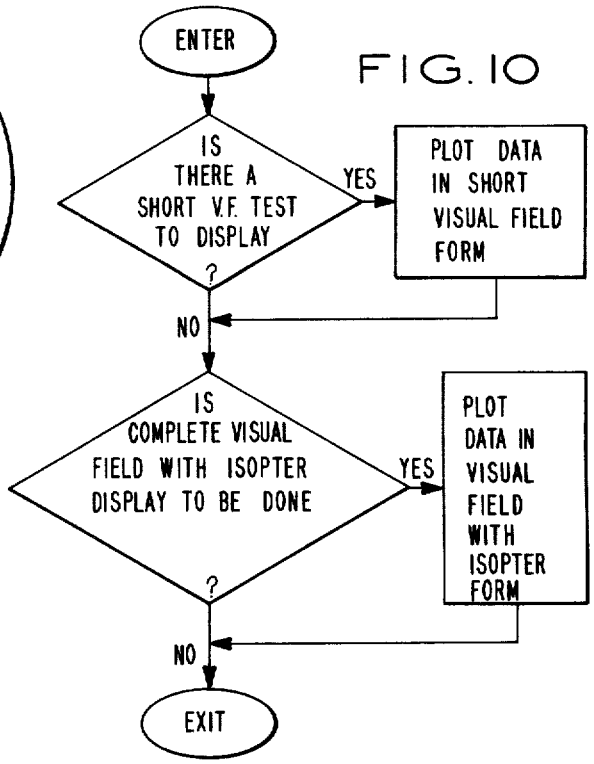
Figure 9:
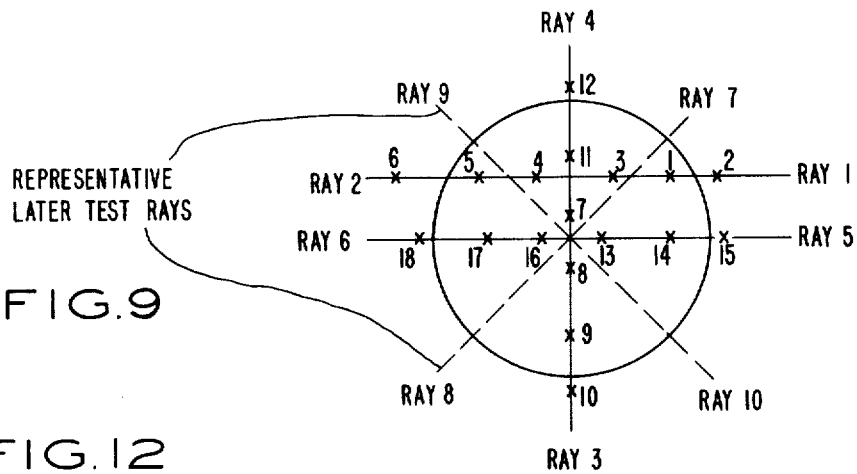
Figure 12:
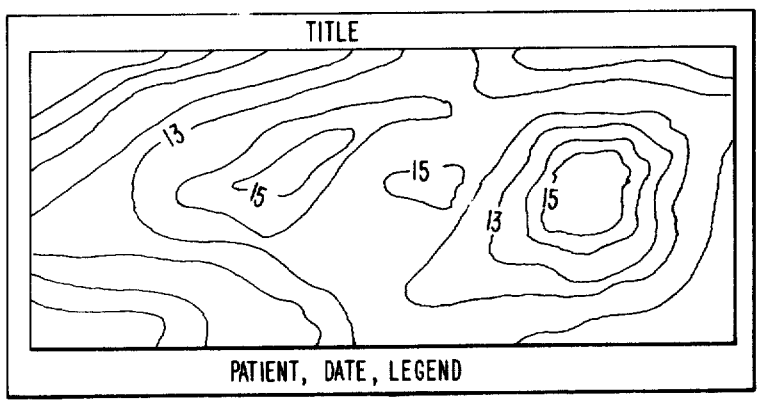
Figure 13A:
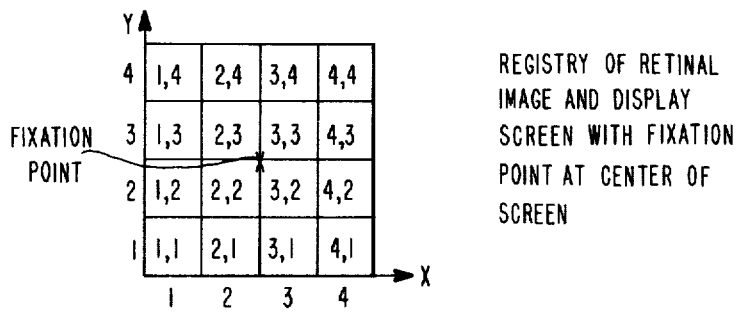
Figure 13B:
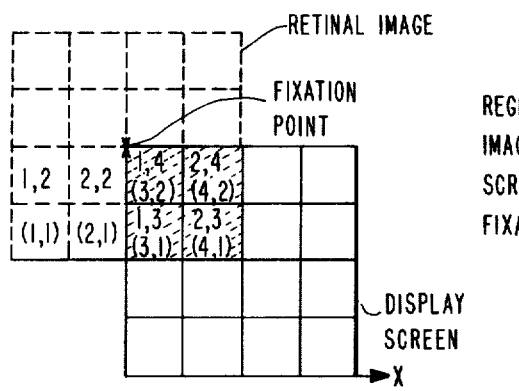
Figure 14:
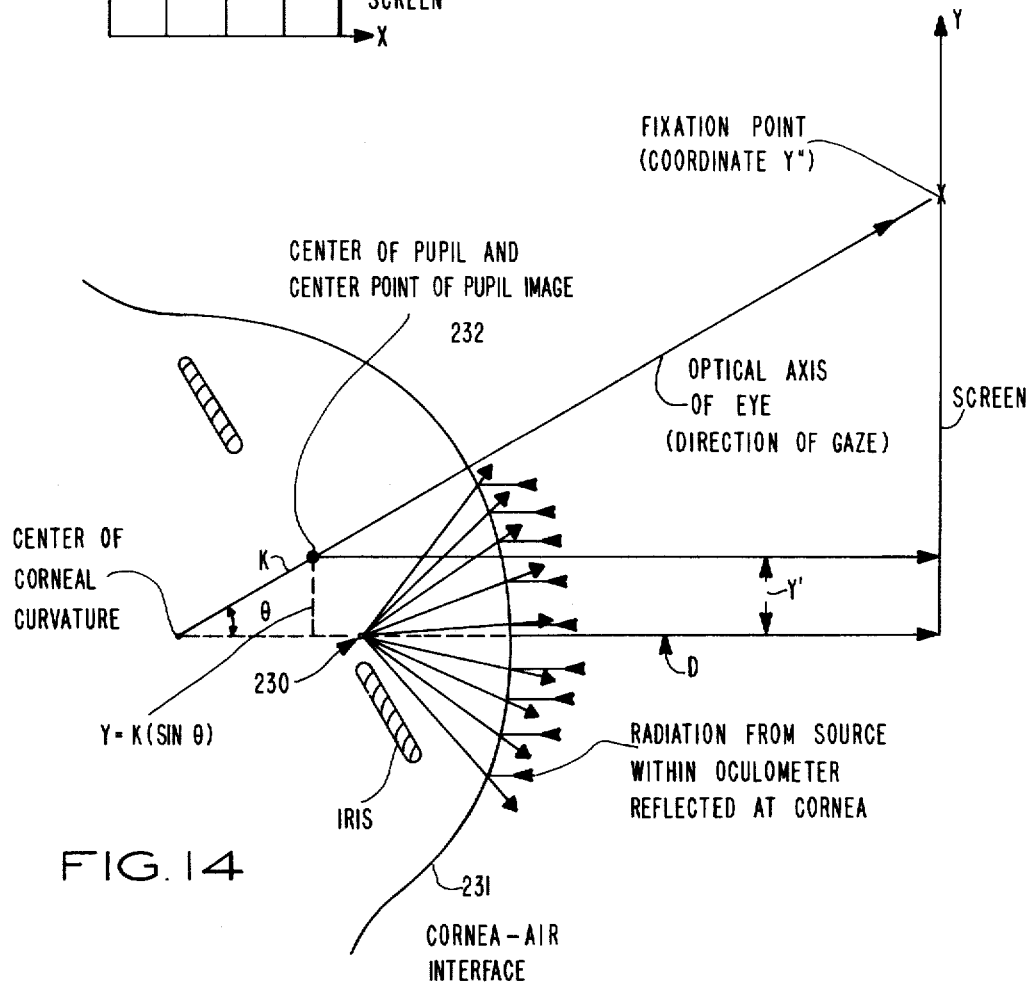
Figure 15:
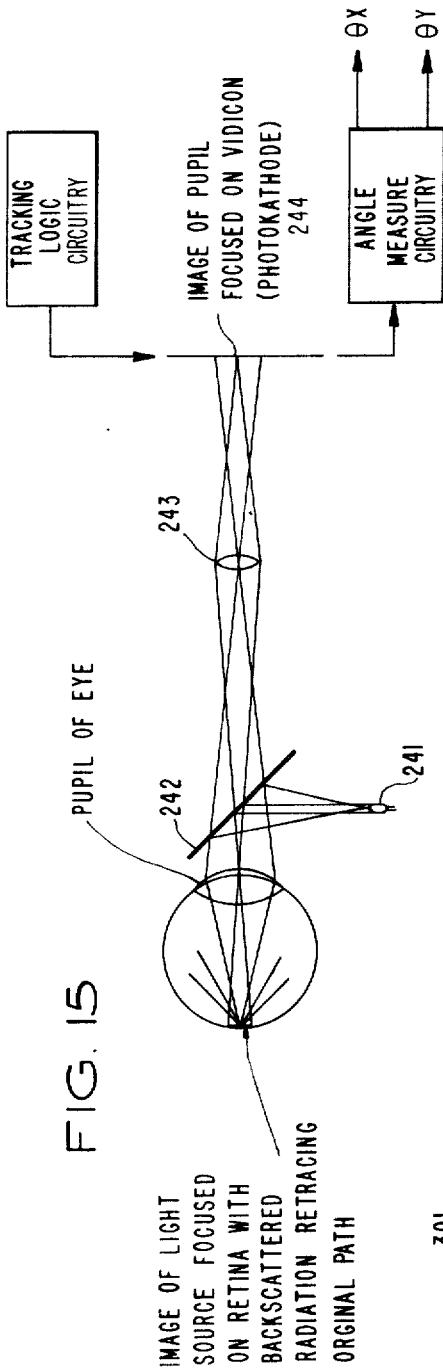
Figure 20:
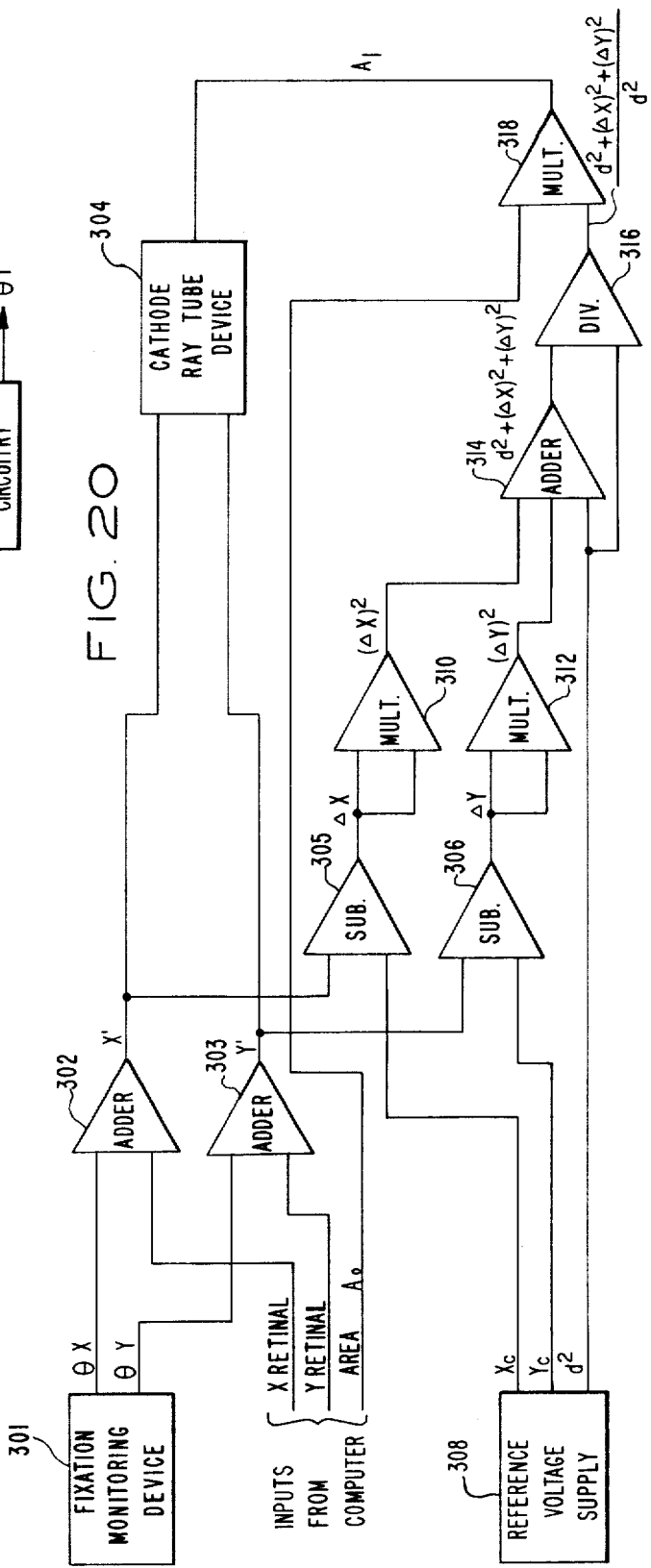

FIGS. 3 to 11 relate one illustrative embodiment of the invention which utilizes the static method of testing as follows:

FIG. 3 is a flow chart of a test program in accordance with one illustrative embodiment of the invention;

FIG. 4 diagrammatically illustrates a preferred format for the test point data;

FIG. 5 is a flow chart of an initialization program;

FIG. 6 is a flow chart showing the interrelationship between functions performed by the computer and the internal equipment during a test cycle;

FIG. 7 is a flow chart of a subprogram to modify data points based upon the subject's response to the stimulus;

FIGS. 8 and 8A are a flow chart of a subprogram for testing blind spots;

FIG. 9 diagrammatically illustrates a preferred method of testing the blind spot;

FIG. 10 is a flow chart of a data output program;

FIG. 11 illustrates one type of output display;

FIG. 12 illustrates another type of output display;

FIG. 13A shows a simplified coordinate system relative to a single fixation point centered on a test field;

FIG. 13B illustrates the shift in the coordinate system as the fixation point moves relative to the test screen;

FIG. 14 diagrammatically illustrates reflective patterns of collimated light impinging upon the eyeball;

FIG. 15 schematically illustrates an oculometer;

FIG. 16 diagrammatically illustrates use of electrooculography for monitoring direction of gaze;

FIG. 17 is a graph showing the manner in which corneal-retinal potential varies as a function of angle of movement of the eye;

FIG. 18 diagrammatically illustrates use of four sensors to obtain information as to both horizontal and vertical angles of movement;

FIG. 19 is a flow chart of a subprogram for translating the screen coordinates of test points to be presented in the test field; and FIG. 20 is a block diagram of apparatus using analog techniques for translating the screen coordinates.

Figure 21:
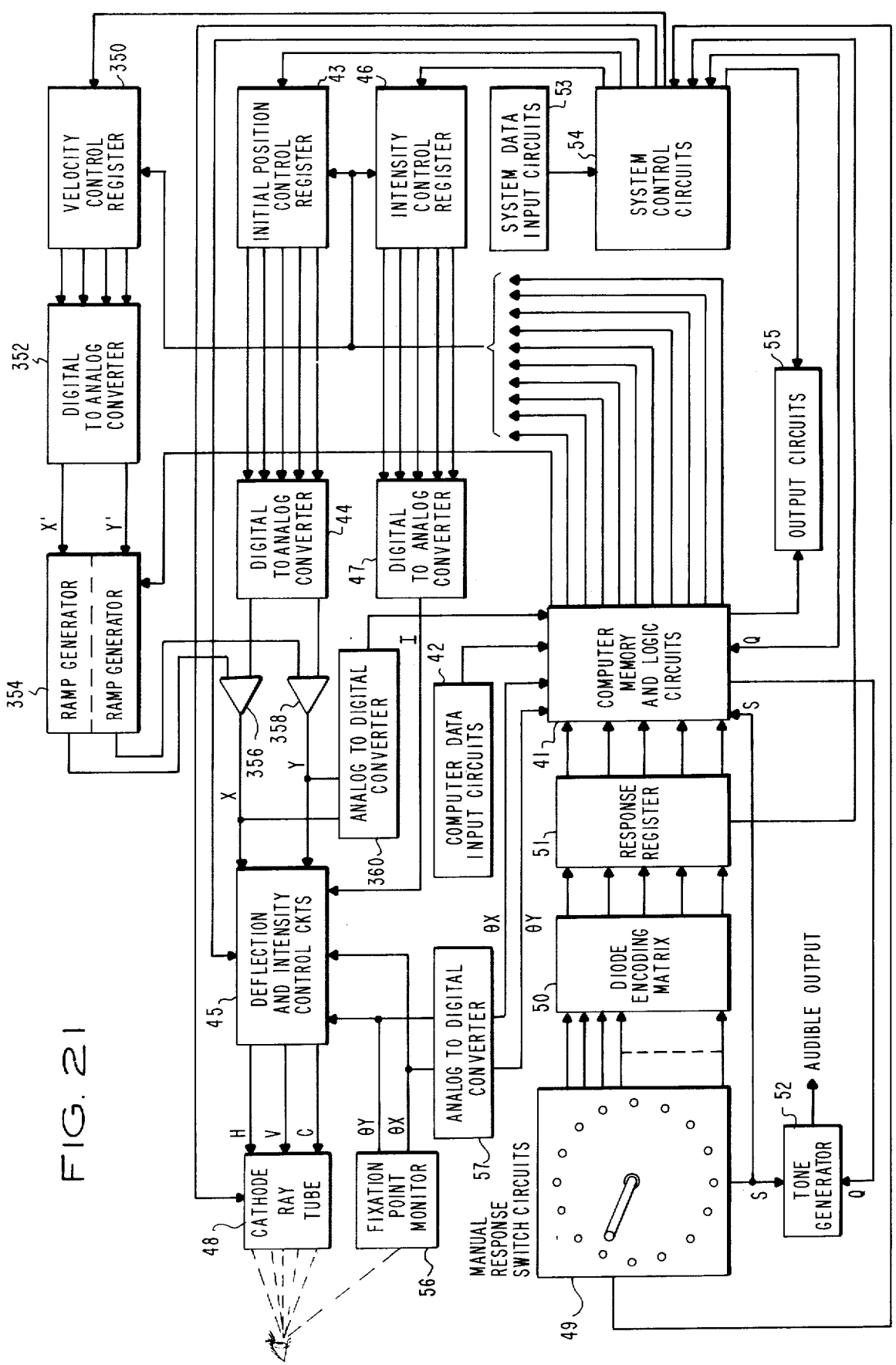
Figure 22:
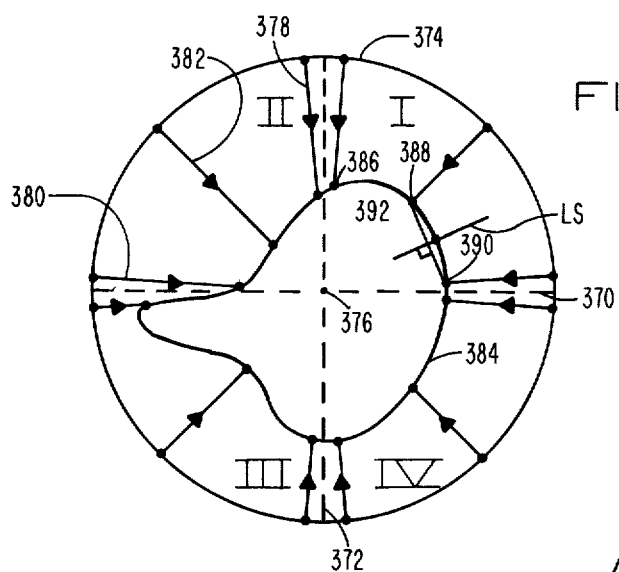
Figure 23A:
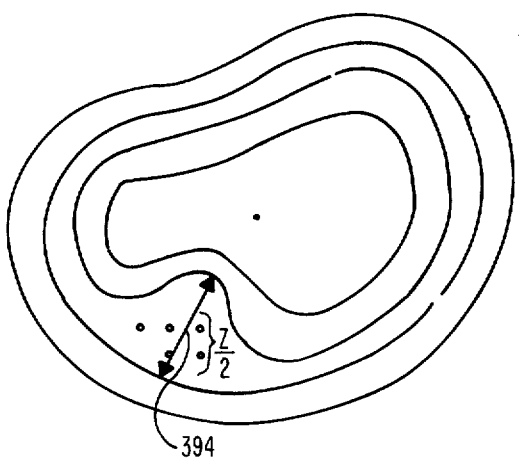

FIG. 21 is a block diagram illustrating apparatus in accordance with another illustrative embodiment of the invention;

FIG. 22 diagrammatically illustrates a preferred method of kinetically testing a visual field;

FIG. 23A illustrates an output display of several isopters and an array of test points used for an inter isopter test.

Figure 23B:
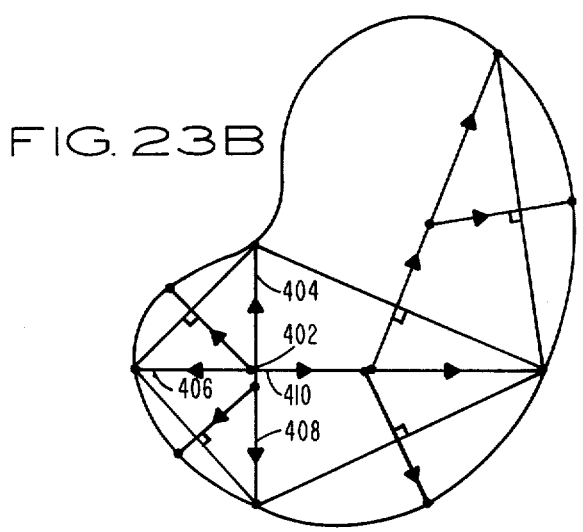
Figure 24:
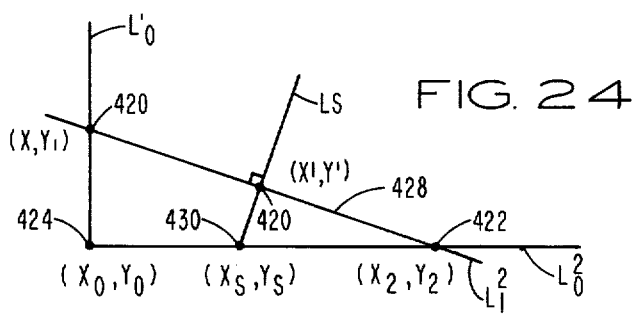
Figure 25A:
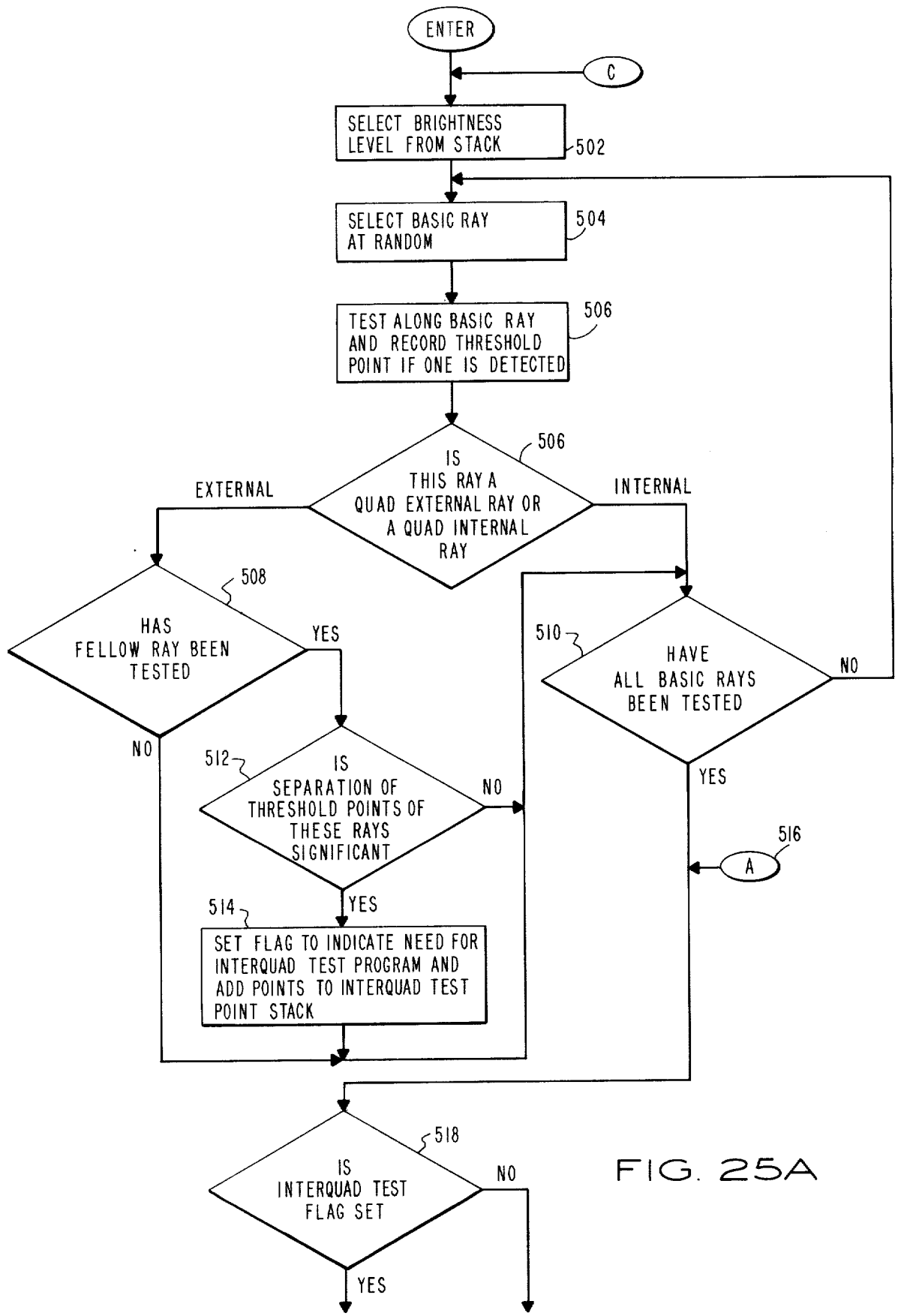
Figure 25B:
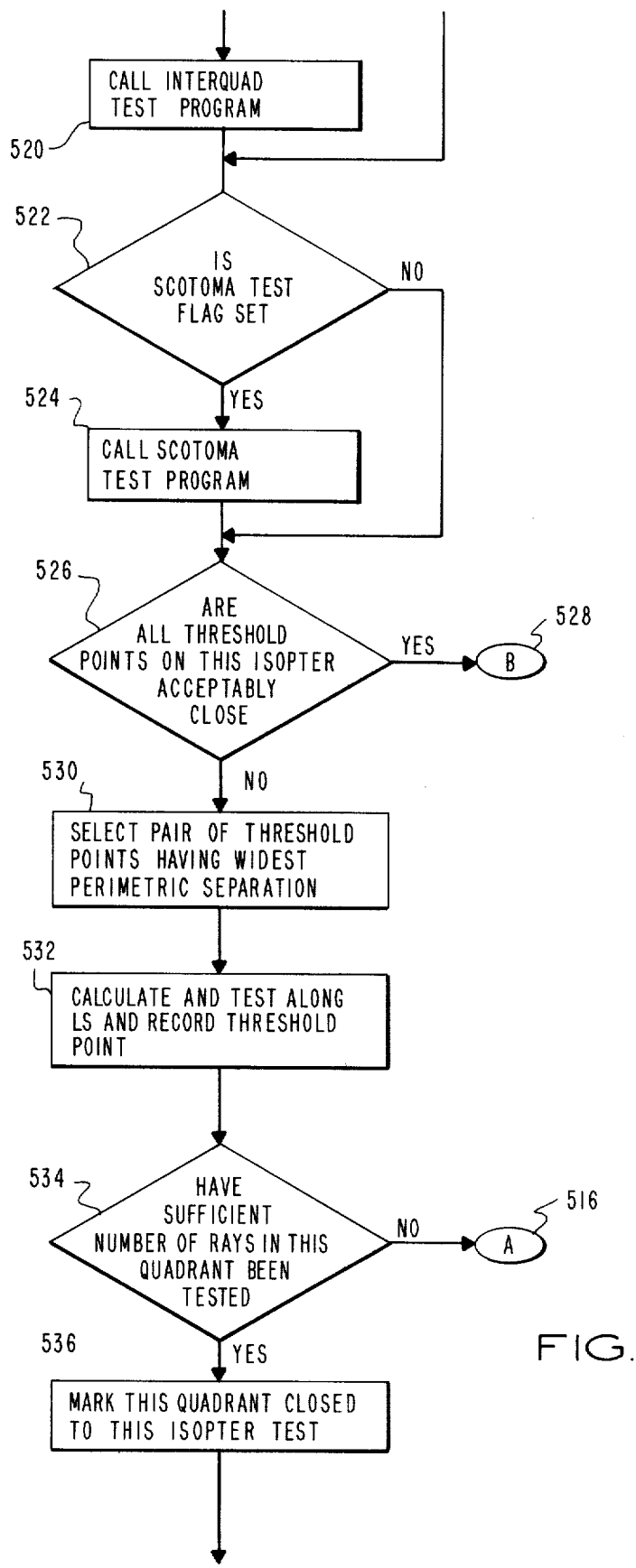
Figure 25C:
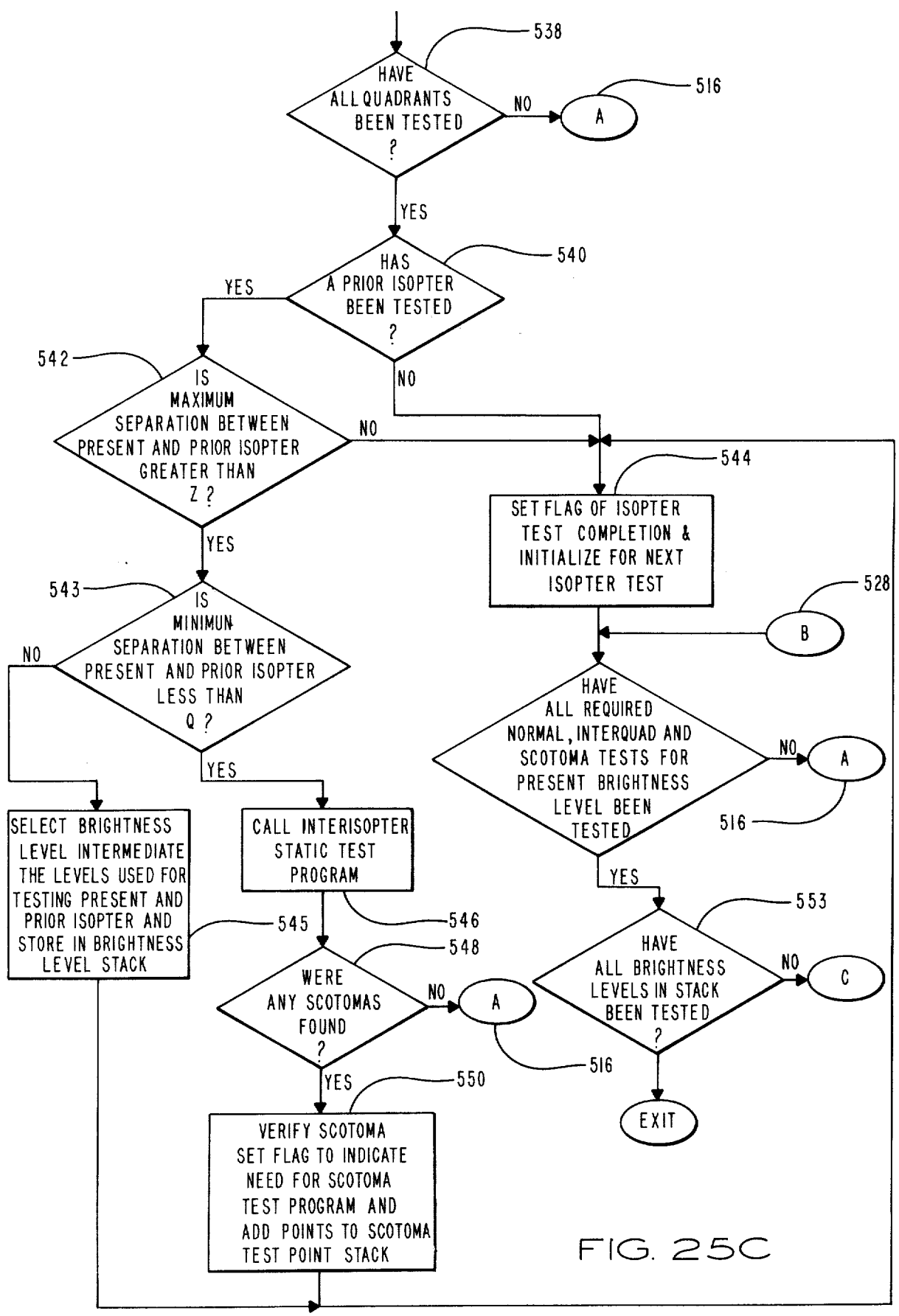
Figure 26:
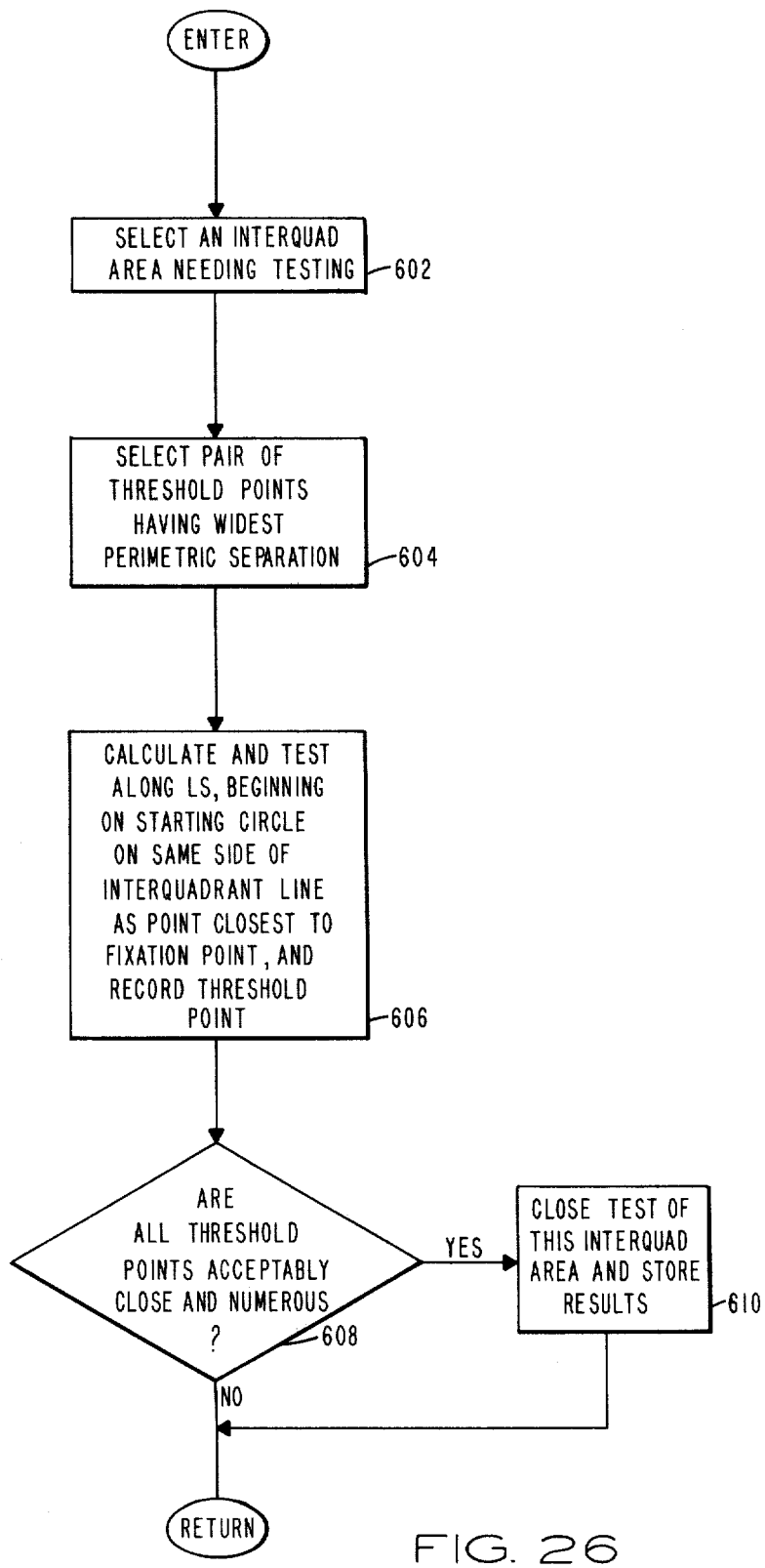
Figure 27:
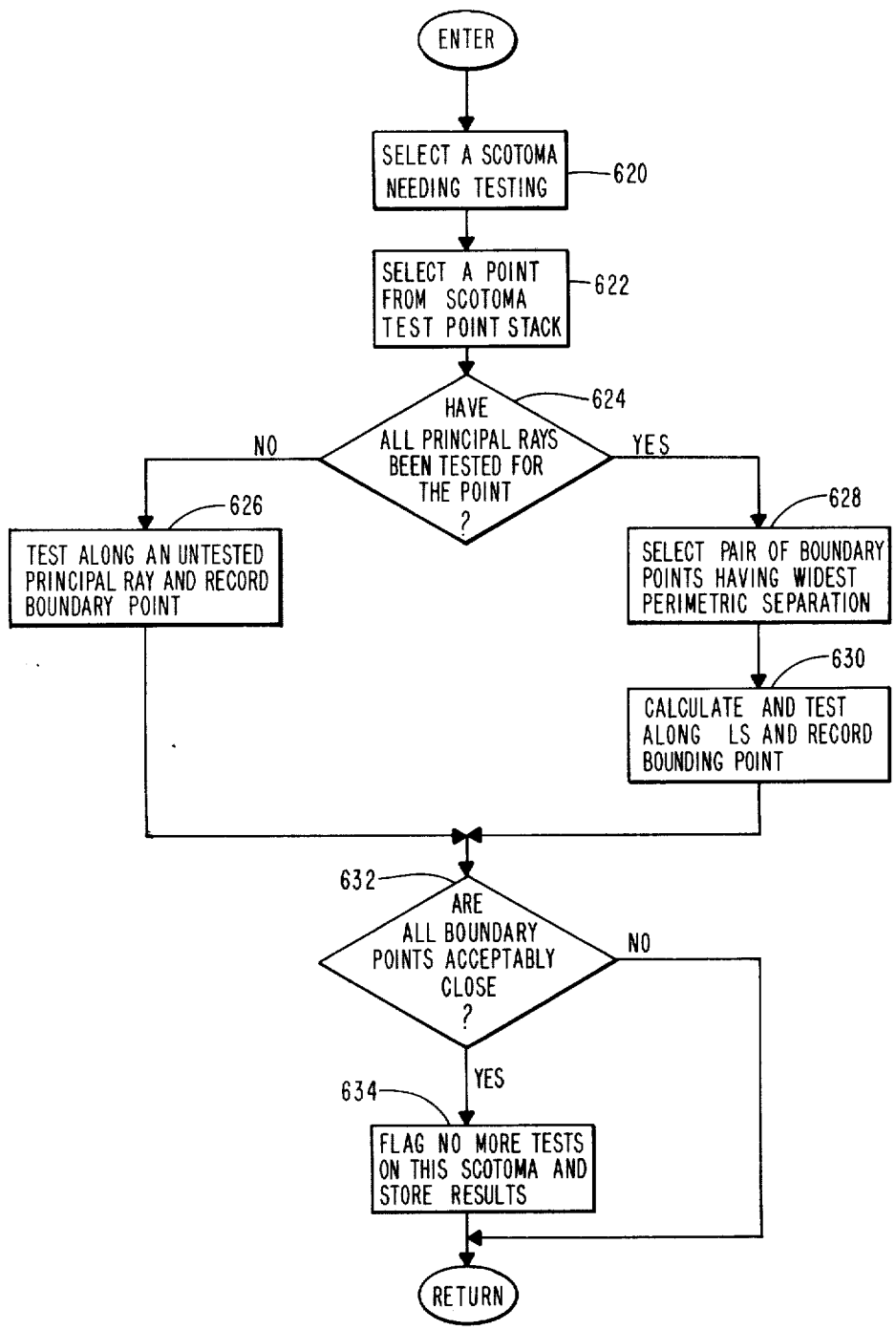
Figure 28:
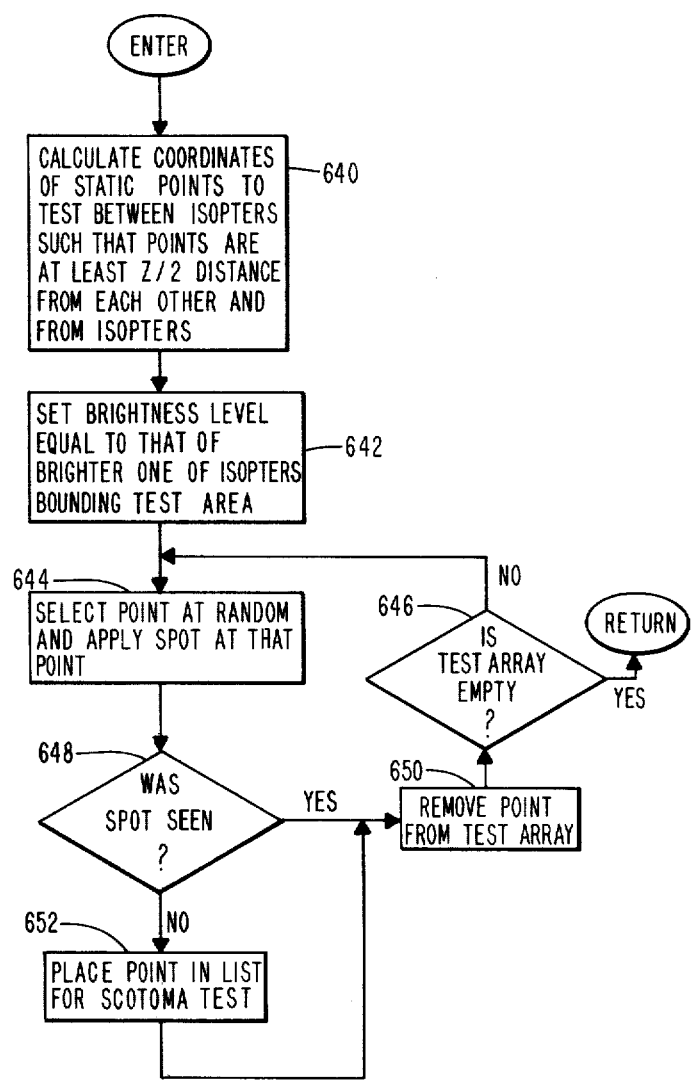
Figure 29:
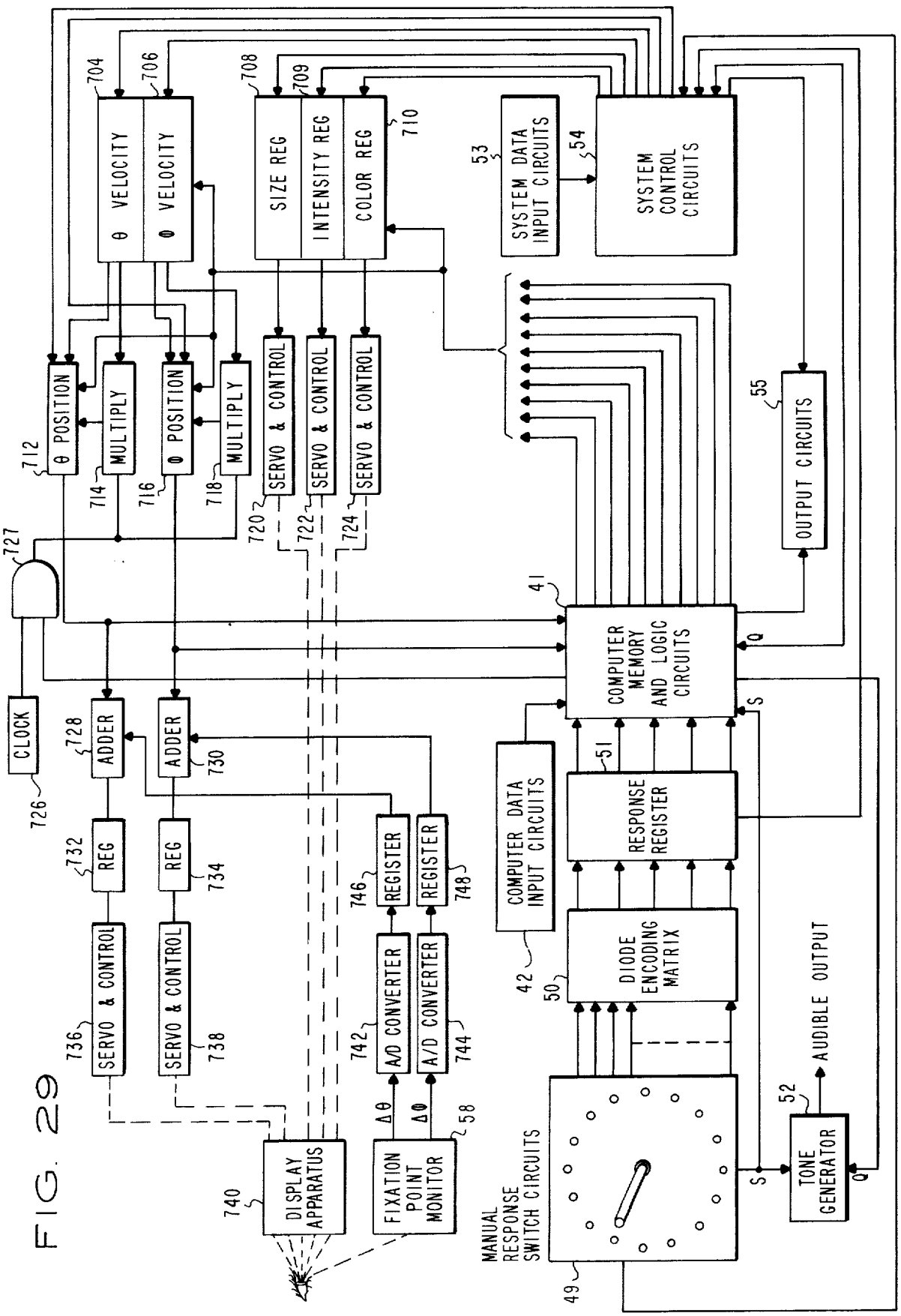
Figure 30:
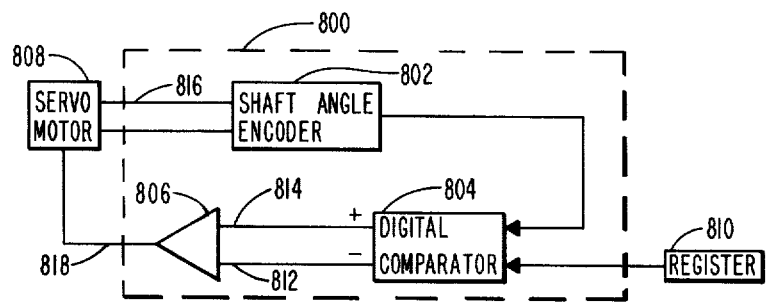
Figure 31:
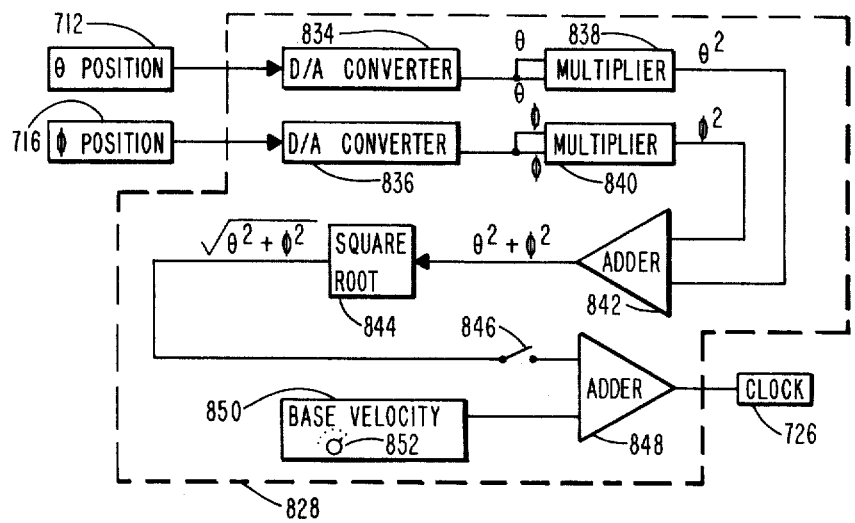
Figure 32:
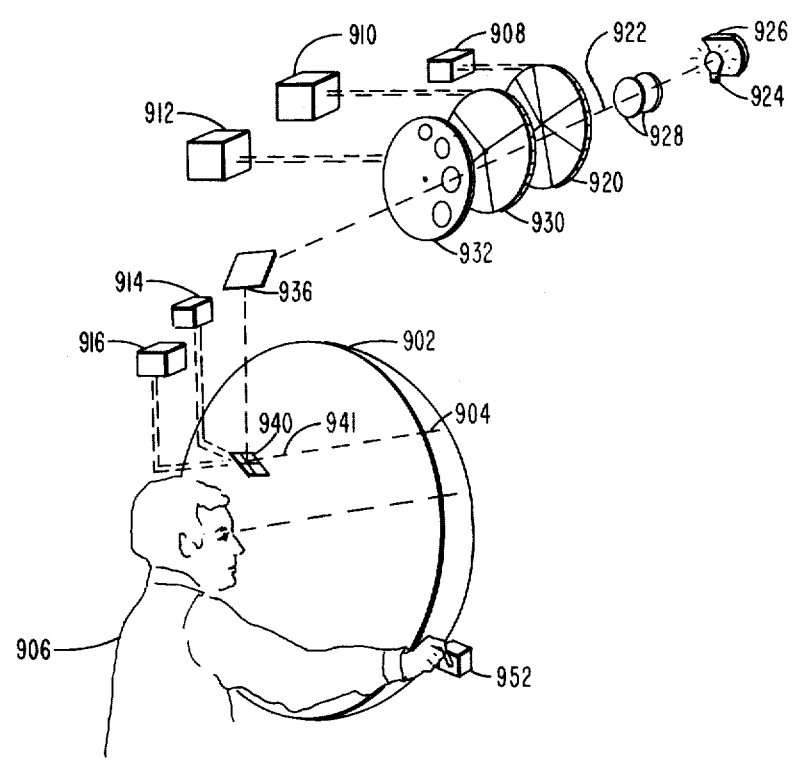

FIG. 23B diagrammatically illustrates a preferred method of kinetically testing a scotoma;

FIG. 24 diagrammatically illustrates a ray perpencidularly bisecting a chord in a Cartesian coordinate system;

FIGS. 25A through 25C, with FIG. 25A positioned above FIG. 25B which is positioned above FIG. 25C, is a flow chart of a test program in accordance with another illustrative embodiment of the invention;

FIG. 26 is a flow chart of a subprogram for performing an inter-quad test;

FIG. 27 is a flow chart of a subprogram for performing a scotoma test;

FIG. 28 is a flow chart of a subprogram for performing an inter isopter test;

FIG. 29 is a block diagram illustrating apparatus in accordance with still another illustrative embodiment of the invention;

FIG. 30 shows in detail the construction of the servo and control units of FIG. 29;

FIG. 31 shows apparatus which may be incorporated in the apparatus of FIG. 29 to vary the velocity of test points FIG. 32 is a perspective view illustrating the display appartus of FIG. 29.

DESCRIPTION OF THE PREFERRED EMBODIMENTS

Figure 2:
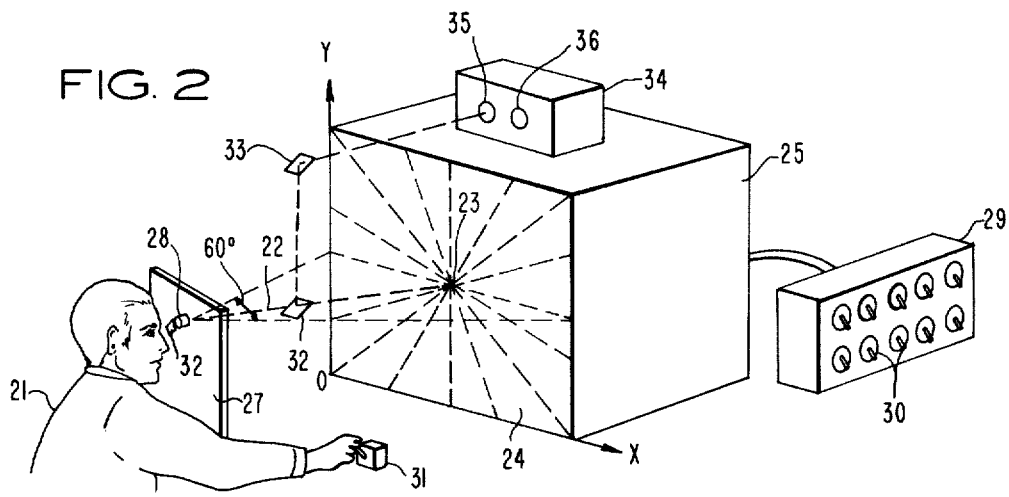
FIG. 2 is a perspective view illustrating the general arrangement of certain elements of the apparaus of FIG. 1 relative to the subject being tested.

The field of vision of the human eye is that part of spacee in which stimuli are visible during the instantaneous fixation of gaze in a particular direction. Referring initially to FIG. 2 of the drawings, the gaze of a subject 21 is fixed along a visual axis 22 in the direction of a fixation point 23 which is situated for the instant in question in the center of a two dimensional test screen. In accordance with one embodiment of the inventin, the test screen is the screen 24 of cathode ray tube 25. It will be appreciated, however, that the test screen need not necessarily be planar and that the principles to next be discussed could be applied to other than two dimensional test screens such as a hemispherical screen as will later be described in accordance with another embodiment of the invention. The visual axis 22 is defined as a line joining the pupil of the eye and the point of fixation 23. A mask member 27 having an eye piece 28 therein preferably defines a head support (not shown) for positioning the patient's head a desired distance from the face of the screen 24 and relative to the eye piece 28. If the visual axis is as indicated, then the face of the cathode ray tube device 25 lies within the face of the cathode ray tube device 25 lies within a portion of the visual field of the subject 21 subtending a horizontal angle of approximately 60° as illustrated. The mask member 27 and eye piece 28 are utilized to permit only one of the subject's eyes at a time to view the face of the cathode ray tube device 25.

A coordinate system having X and Y axes as indicated in FIG. 2 with the origin located at the lower left-hand corner of the screen may be utilized to define locations in the visual field of the subject 21 by assigning two coordinate numbers X and Y to any point on the screen 24 of the cathode ray tube device 25. Thus locations in the visual field of the patient may be quantized in a manner convenient for handling by automatic data processing equipment which is connected and programmed in a manner to conduct the test of the subject's visual field as will be hereafter described.

The method of visual field testing of the present invention contemplates the possibility that the location of the subject's fixation point (shown on 23 in FIG. 2) may vary during the test. This will change the orientation of the subject's visual field relative to the face of the cathode ray tube device screen 24. The visual field test need not be interrupted because of this, however. By providing some form of fixation monitor, coordinate translation of the subject's direction of gaze may be taken into account in the visual field test. One such device, which will be discussed in more detail subsequently, is shown schematically in FIG. 2 as an oculometer 34. Of course, other fixation monitoring devices such as an electro-oculograph monitor which uses skin electrodes (not shown) attached to the mask member 27 could be used, as will be subsequently discussed. In the case of the oculometer device, 34 of FIG. 2, half silvered mirrors (or beam splitters) 32 (two of which are shown—one between the mask member 27 and screen 24 for ease of illustration and one between the subject's eye and the eye piece 28 as it would actually be positioned) and 33 could be used. In practice, the mirror 32 is positioned between the subject's eye and the eye piece in order to cover the entire visual field without being of large size and to prevent interference between the optics of the oculometer and corrective lens placed in the eye piece. Oculometer 34 contains a source of illumination 35 and a reflected radiation monitor 36 to track eye movement and provide data on it to correct the test regime a needed to compensate for the eye movement. Although the beam splitters only transmit a portion of the light from stimulus presented on the screen to the eye of the subject, his performance in the visual field test is not affected significantly as the percentage of light reflected is constant and compensation can be made.

To the right of the computer driven cathode ray tube device 25 and oculometer 34 in FIG. 2 is a control panel 29 which is illustrated schematically. Control panel 29 has a plurality of toggle switches 30, or the like, which may be used by the examiner to indicate conditions of the test or to input data to the automatic data processing equipment. A manual response device 31 is situated between the masking apparatus 27 and the face 24 of the cathode ray tube 25 within convenient reach of the subject 21. During the course of the visual field examination the subject 21 communicates with the automatic data processing system by the use of this manual response device. Details of the operation of the manual response device 31 will be discussed subsequently.

It is important to note that communication between the subject and the automatic data processing system can be obtained in other ways. For example, an electroencephalograph (EEG) can be used to monitor the evoked cortical potentials in the occipital cortex which occur in response to a visual stimulus of sufficient magnitude and indicate to the processing system that a stimulus was seen. An electroretinograph, which detects an electric signal produced by the retina when stimulated by light, or a pupilometer which detects a reduction in the size of the pupil when the retina is stimulated by light, will provide a similar function. It will be noted that the oculometer can provide a pupilometric function, but that electroretinograph or pupilometers do not test all neural connections to the brain; i.e., they will detect that the eye was stimulated but not if the stimulus detected by the eye was transmitted to the conscious level of the brain. Detection of the visual response by having the subject look in the direction of the spot is also possible. It should be noted that for the purposes of this disclosure, the terms "perception" and "response" are synonymous and refer to both cortical and subcortical responses of the subject.

While not shown in the drawing of FIG. 2, it will be understood by those skilled in the art that any corrective, refractive lenses required are placed between the eye of the subject 21 and the face of the cathode ray tube 25, such as in the eye piece 28, to correct for refractive defects which the subject may possess.

One type of examination to measure the extent to which the normal eye can detect the presence of objects which are off the visual axis may be referred to as perimetry. Large or relatively bright test objects may generally be seen at locations having coordinates quite eccentric from the fixation point. On the other hand, small objects or those with low contrast in comparison with the background usually cannot be seen until their angular distance or eccentricity from the visual axis is relatively small. In an examination by perimetry, the distance from the test stimuli to the eye is maintained constant (i.e., test stimuli are presented on the surface of an arc or hemisphere centered at the eye). Campimetry is a method similar to perimetry for measuring the visual field in which test stimuli appear at distances from the patient's eye proportional to the minimal eye-screen distance by the secant of the angle of eccentricity. That is to say, a testing apparatus such as shown in FIG. 2 is a campimetry device since the surface upon which the test stimuli are displayed is a plane surface, and hence, objects near the edges of the test screen 24 are a short distance further from the eye of the subject 21 than stimuli presented near the center of the screen. This, of course, slightly affects the size of the stimuli as they appear to the test subect. Both perimetry and campimetry are valid tests and may be used equally well to examine the visual field of a subject. It is, however, difficult to compare results of these different types of tests quantitatively. In the embodiment of the invention now being described, the principles of static perimetry or campimetry are utilized in which stationary stimuli are presented at various selected locations in the visual field of the subject. The stimulus value or size and brightness of these stimuli may be varied and as previously discussed, the order in which they are presented to the subject is preferably varied in an unpredictable manner. Moreover, as the direction of gaze of a subject changes the campimeter (or plane surface) device display used in the present embodiment must be corrected for the size effects that coordinate translation of the fixation point will have on the stimuli presented in the visual field of the subject. The use of the fixation monitor equipment can be made to take this into account as will be discussed in more detail subsequently. Where the principles of the present invention are applied to other than planar visual field test screens, the corrections which must be applied will vary from those described below. The hemisphere, for example, requires no correction.

The threshold value of a point in the visual field of a subject may be defined as the degree of stimulus just required for perceptual response in the test area. For a stimulus to qualify as the threshold of static perception, the response to a given stimulus value must be coupled with the failure to respond to a second stimulus value which is one quantized step dimmer than the intensity of the stimulus which was seen. A form of recording the visual field which is useful is a record of the numerical threshold values at selected points in the visual field.

In the present invention an automatic data processor or digital computer completes a two-way feedback loop between the test subject and the test regime or routine. In this two-way feedback system the test regime itself may be updated based on the response of the subject. By use of an audible subject response indicator, the subject is provided with an indication of success or failure in responding to the stimuli presented. A pleasant tone is presented to the subject for a corect response while an unpleasant tone indicates an incorrect response. This feature helps to sustain motivation of the test subject, as well as increase the precision of his response. Motivation is an important psychological factor to obtain accurate results in visual field testing.

In perimetry or campimetry the degree of fixation or the ability of the patient to maintain his gaze at a fixed point has been crucial in performing a valid examination. The present embodiment may be utilized to provide a test of the visual field which does not require perfect fixation. This eases the stringent psychological requirement on the subject to fixate, improving test results. Eye movement of the subject can be monitored and instantaneously taken into account in the testing regime by the use of proper equipment.

Referring to FIGS. 13A and 13B the effect of the shift of a subject's fixation point is illustrated in a simplified 4×4 coordinate system where coordinates in parentheses denote test field coordinates and the coordinates not in parentheses denote test screen coordinates. In FIG. 13A it is assumed that the subject's fixation point exactly coincides with the center of the test screen being used to perform the visual field test (i.e. such as CRT screen 24 of FIG. 2). A test point on a test field which is centered relative to the direction of gaze of the subject has coordinates which correspond with the ccoordinates of the test screen. That is to say, with the gaze directed toward the center of the screen, the coordinates of a test point in the test field are defined precisely by the corresponding test screen X-Y coordinates described previously and illustrated in FIG. 13A. Now if the direction of gaze shifts to a different fixation point (as in FIG. 13B) then the coordinates of the test screen no longer coincide with the test field coordinates, which shifts so its center remains at the location of direction of gaze. Thus, a point which was, say coordinate (4,1) in the test field and 4,1 on the screen, now becomes coordinate 2,3 on the screen while remaining coordinate (4,1) in the test field. It should be noted that in this instance the $x$ coordinate is decreased by 2 and the $y$ coordinate is increased by 2. Similarly, coordinates (3,2) in the test field become 1,4 on the screen, coordinates (4,2) become 2,4 etc. The corrected location of points in the test field on the screen when the direction of gaze is away from the center of the screen is thus determined merely by translating the test point coordinate (in the screen coordinate system) by an amount equal to the translation of the direction of gaze. Of course an extreme translation of the direction of gaze could result in many of the points in the test field lying outside the screen area. If more than a desired percentage of the test points lie outside the screen area, it is possible to signal the subject in some manner to return his direction of gaze to within acceptable limits on the display screen and/or to halt the test procedure until such is accomplished. Of course, if the point under test at the instant of the shift in gaze is moved from the screen, that single test must be considered invalid and repeated.

There are alternative methods possible for monitoring the screen coordinates of the direction of gaze. One such, the oculometer system, has been discussed briefly with respect to FIG. 2. A system of this type will now be described in more detail with respect to FIGS. 14 and 15. Referring now to FIG. 14 (and considering only a one dimensional translation of the fixation point on the screen of an image dissector tube, say in the Y coordinate direction) the geometry involved in following the eye movement is shown. The basic measurement principle of an oculometer is that eye direction is defined by the position of the corneal reflection of a light source relative to the center of the pupil of the eye. Assuming that the eye is illuminated along an axis as shown by a point source of light effectively at infinity (not shown) and is imaged by an optical system with a collection aperture optically coincident with the light source, the reflection of some of the incident, collimated radiation at the cornea-air interface 231 forms a virtual image 230 of the point light source which lies approximately in the plane of the pupil. For each individual eye, the displacement Y of this virtual image relative to the center 232 of the image of the eye pupil, as measured by the image dissector tube, is proprotional to the coordinate Y of the direction of gaze on the screen. The displacement of this virtual image of the point source from the center of the eye pupil image is given by $$Y = K \sin \theta$$

where $K$ is the distance between the plane of the iris and the center of curvature of the cornea and $\theta$ is the angle between the optical axis of the eye and the direction of the incident radiation. The quantity $k$ can be determined as a calibration of the oculometer for a given individual at the beginning of the test, by having the subject fixate on at least one and preferably several points with known coordinates, one of which is the center of the screen. Once this calibration has been made, then the angle $\theta$ may be measured. Once the angle $\theta$ is known, since the screen is situated a known distance (D in FIG. 14) from the subject, the fixation point coordinate $Y^{11}$ may be determined from the relation $$Y^{11} = D \tan \theta$$

For small angles the relationship $$\sin \theta = \tan \theta = \theta$$

will be nearly correct. Thus for purposes of selecting coordinate translations, once the calibration constant $K$ is known, then the coordinate $Y^{11}$ of the displaced fixation point may be computed as (for small angles $\theta$)

$$Y^{11} = D\theta.$$

This approximation is good for angles less than 10°. It will be appreciated that the more precise trigometric function is required for larger angles. A similar analysis is applicable to displacement along the X axis and if $\theta_x$ is the angle denoting the angular displacement of the direction of gaze along the X axis and $\theta_y$ that along the Y axis then $$Y^{11} = D\theta_y$$
$$X^{11} = D\theta_x.$$

An oculometer for monitoring eye movement and operating on the principle just described is commercially available from the Honeywell Corporation of Boston, Mass. Such an oculometer is illustrated schematically in FIG. 15. In the oculometer of FIG. 15 the eye is illuminated by a light source 241, which may, for example, comprise an infrared source so as not to distract the subject from the visual field examination, via a beamsplitter 242 (as shown in FIG. 2). The refractive media of the eye (primarily the cornea and the lens) transmit the light to the retina. Radiation backscattered from the retina illuminates the pupil. An image from the illuminated eye pupil is focused onto the photocathode 244 of a vidicon tube or the like (not shown) by a lens 243. An electronic system including tracking logic to follow the source image on the pupil image (not shown, but a part of commercially available oculometer) then serves to measure the angles $\theta_y$ and $\theta_x$ discussed previously and to provide output signals in digital or analog form as desired which are representative of these quantities. These quantities may then be used as will be described subsequently to correct or remove the effects on the visual field examination of the change in the subject's direction of gaze.

Alternatively, the direction of gaze may be determined, perhaps somewhat less accurately but with sufficient provision for visual field testing, by utilizing the principles of electro-oculography. This technique is based on the fact that a D.C. potential difference exists between the corneal surface (at the front of the eye) and the posterior vascular layer of the eyeball. This potential is known as the corneo-retinal standing potential and is illustrated in a highly schematic manner in FIG. 16 which shows the corneal portion 251 of the eyeballs having a positive potential with respect to the posterior or retinal portion 252. This standing potential varies from person to person somewhat but has been observed to be as great as 1 millivolt in some individuals and as small as 0.30 millivolts in others. A value of 0.50 to 0.70 millivolts may be regarded as typical for the corneo-retinal standing potential.

Electrodes 253 and 254 situated as shown in FIG. 16 can be used to monitor eye movement in a horizontal plane by measuring variations in the electric field surrounding the eye produced by the corneo-retinal standing potential. For example, suppose that the eyeballs illustrated schematically in FIG. 16 rotate in a horizontal plane in the direction indicated by the arrows 255 and 256 through the angle $\alpha$. This would bring the positive corneal surfaces of the eyes closer to electrode 254 and similarly bring the negative posterior regions closer to electrode 253. This would increase the potential difference between the two electrodes from its initial value before the eye movement. The algebraic sign of the movement is also indicated by the direction of the potential difference change as measured at the electrodes. A typical graph of the voltage produced in this manner by eye movement as a function of the angle the eyeball moves is shown in FIG. 17.

In FIG. 17 the voltage between electrodes 253 and 254 is plotted as a function of the angle of movement $\alpha$. In the strictest sense this voltage has appeared to be a function of the sine of the angle $\alpha$ for some patients while appearing to be a linear function of the angle for others. In a practical sense, however, the assumption that the voltage generated by the corneo-retinal potential due to eye movement is a linear function of the angle through which the eye is rotated is valid for the case of small angles (less than 30°) which can be tolerated in correcting for direction of gaze changes in the system of the present invention.

The D.C. amplifier 257 of FIG. 16 is used to amplify this relatively small voltage and the resultant output may be calibrated for a given individual at the beginning of the visual field test to provide the $\theta_x$ data previously discussed which is needed to compute the relative coordinates of the fixation point on the test screen. Similarly, a second vertical set of electrodes 260 and 261 of FIG. 18 can be used in conjunction with the horizontal electrodes 262 and 263 to measure vertical eye movement and the amplified voltage thus derived can be used to provide the $\theta_y$ output as previously discussed. Because of the individual variation in the corneo-retinal standing potential, calibration of such an electro-oculographic eye movement monitor would be necessary at the beginning of each visual field test. Of course, this may easily be accomplished as previously discussed in the case of the oculometer by using fixation points separated by a known distance or angle on the test screen. In practice, only three electrodes are used, and as is well-known in the art the potentials from the three electrodes can be used to derive both the $\theta_x$ and $\theta_y$ outputs.

The electrodes used to measure the eye position in this technique could be placed on the masking screen 27 of FIG. 2 if desired, or could alterntively be attached to the subject's skin by adhesives and connected to the remainder of the system by flexible leads. In either case it is desirable to have a good skin electrode contact as the voltages being measured are relatively small. Using this technique it is possible to determine the eye orientation to an accuracy of about 1°. This provides accuracy sufficient for fixation point monitoring in the visual field test.

Figure 1:
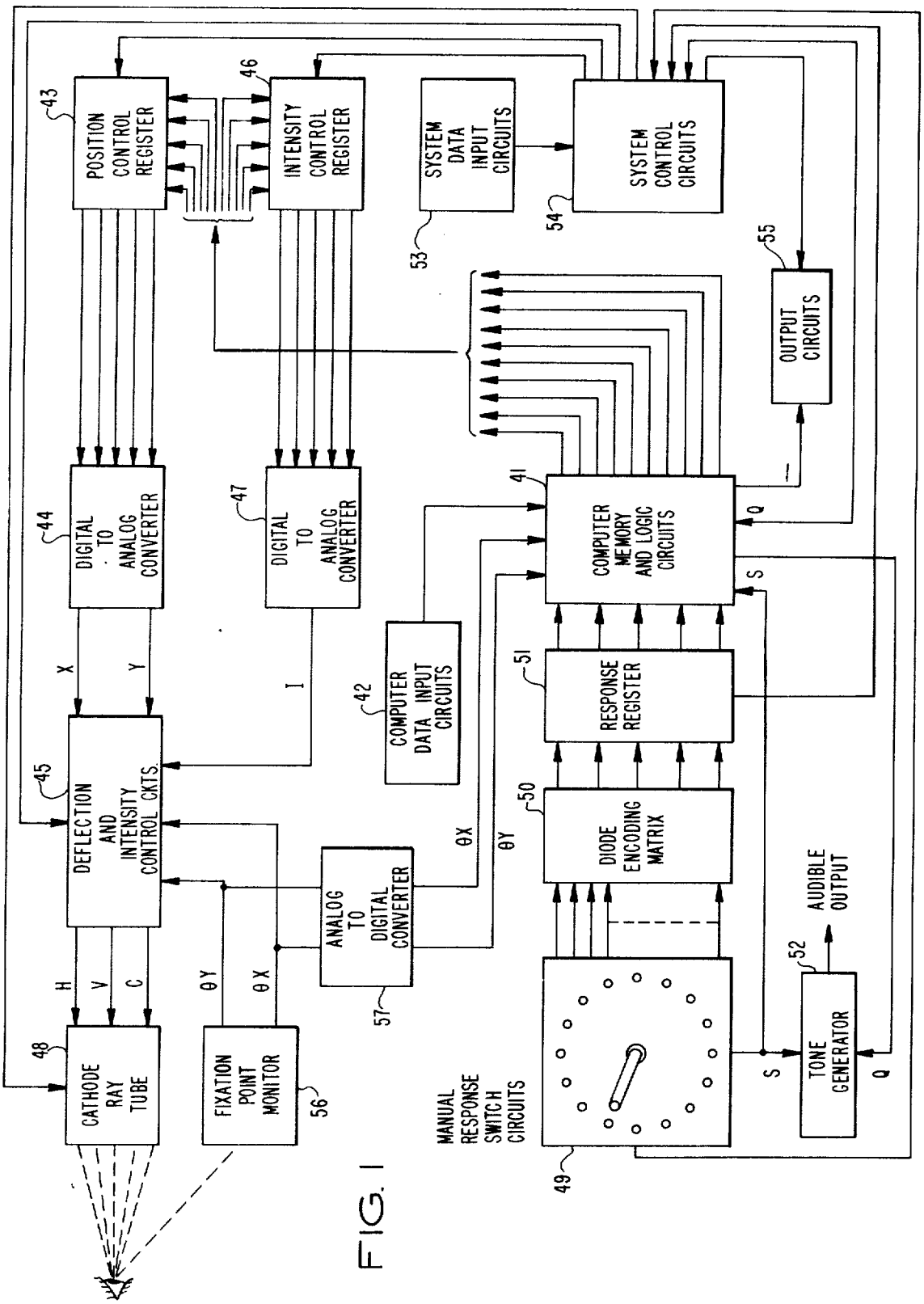
FIG. 1 is a block diagram illustrating apparatus in accordance with one illustrative embodiment of the invention.

Referring now to FIG. 1, the overall system of one embodiment of the present invention is shown in block diagram form. The "backbone" of the system is an automatic data processor or general purpose digital computer 41. The computer 41 may be any one of a number of available general purpose computers or a special purpose hard-wired machine. Alternatively, some or all of the system of the present invention could be used in time-sharing mode on a large scale computer system if desired. In this mode a plurality of systems having an external hardware configuration such as shown in FIG. 1 could be located remotely, say in doctors' offices, and processed in parallel by a single large computer. In any case the computer 41 communicates to the external world and to the subject patient via a plurality of external devices. For example, the computer data input circuits 42 may comprise any of a variety of input devices such as a tape reader, card reader or typewriter, etc.

Outputs or commands in the form of digital numbers from the general purpose digital computer 41 are supplied on a plurality of data lines to the external testing equipment. For example, the X-Y screen coordinates of a test spot at which a stimulus is to be generated can be provided from computer 41 to a position control register 43 in the external equipment. The contents of position control register 43 are converted to analog form by digital-to-analog converter 44 and are supplied as a pair of analog signals to appropriate deflection control circuit electronics 45. The operation of such analog position control circuitry may be similar to that of a conventional television set as known in the art or that used in digitally controlled conventional CRT's.

The intensity control register 46 received digital outputs from computer 41 and its contents are converted to analog form by a second digital to analog converter 47 which presents the intensity control signal in analog form to the intensity control circuits 45. Deflection and intensity control circuit unit 45 utilizes the three analog input signals along with the optional $\theta_x$ and $\theta_y$ analog signals from the fixation point monitor 56 to provide a spot or test stimulus at the requested coordinates and with the requested intensity on the face of the cathode ray tube 48. The apparatus thus provides test stimuli to the subject under program control of the computer 41. The fixation point monitor 56 preferably provides analog correction information to the deflection and intensity control circuit 45. Digital correction information is also provided via analog to digital converter 57 to the computer 41. This digital information can be used in the program as will be described subsequently to determine if the direction of gaze is within acceptable limits on the screen and if the test spot to be presented would fall at an appropriate location, and to cancel the test if either is not acceptable. Digital correction information can also be used to provide correction information to converter 44, and thereby correct the deflection circuits. More precise control can be obtained by applying the analog information from the monitor 56 directly to control circuit 45, and is preferred.

The subject completes the test loop by responding manually via the manual response switch circuit 49. This manual response circuit is also referred to herein as the "joystick". Operation of the manual response device does two things. First, the sector or angular arc in which the joystick contact is completed is encoded in digital form by a diode encoding matrix 50 and supplied to a digital response register 51. The digital response register 51, in turn, may be sampled selectively by the computer 41 under program control. Secondly, operation of the joystick 49 acts to start tone generator 52 to produce an output. As will be described subsequently, the pitch of this audible output is changed between different levels for indicating to the subject whether his response to the test stimulus was correct or incorrect, i.e., sufficiently prompt and precise in direction.

Conditions of the testing may be controlled by the system operator through the use of the switches 30 of panel 29 of FIG. 2. These switches correspond to the block 53 labeled "system data input circuits" in the drawing of FIG. 1. These switches may be used to control system parameters such as the duration of the test spot and the time between applications of test stimuli to the subject. Other system parameters such as whether to recheck the threshold level at positions in which the measured threshold differs more than a preset amount from a predicted threshold level may also be controlled by positioning these switches appropriately. Such is desirable to prevent errors due to lack of patient attention or other factors. Switches on the console can also determine whether fixation point correction will be applied should the subject's direction of gaze vary during the test and the accuracy of patient response required. The switch positions are encoded as digital numbers by the system data input circuits 53. The system control circuits 54 are rendered responsive to the output of the data input circuits 53 and allow the computer 41 access to the status of the switch settings.

The system communicates with the operator and the outside world through the use of output circuits 55. The circuits may comprise any of a variety of computer output didplay or record devices such as a cathode ray tube, a graph plotter, a line printer, a typewriter, or other desired device capable of converting the computer output to a form usable in the external world. The system control circuits 54 are also in communication with computer output circuits 55 so that the status of the system may be monitored by the operator.

In operation, the system of FIG. 1 is set in motion by the operator through the computer data input circuits 42 and the system data input circuits 53. These data input circuits are utilized together with the program control of the digital computer 41 to generate test stimuli on the face of the cathode ray tube 48 via position control register 43, intensity control register 46, their associated digital-to-analog converters 44 and 47, the fixation point monitor device 56 and the deflection and intensity control circuits 45. When a stimulus is presented the patient responds by indicating the angular sector of the test field (denoted by the dotted line wedges of FIG. 2) where the stimulus was observed via the manual response device 49. The subject's response is rendered in form useable to the computer 41 via the diode encoding matrix 50 and response register 51. A suitable response feedback (correct or incorrect) is supplied to the patient via the tone generator 52. The response of the subject is then dynamically used in the program to alter the testing process. When the testing is complete, as determined by the program, output circuits 55 under program control sample the status of the system control circuits 54 and the visual field data generated by the test and render these data to a form useable by the examiner. Thus the system of the present embodiment provides attention maintaining audible feedback to the test subject and dynamically varies the testing process while conducting a visual field examination utilizing the principles of campimetry and perimetry under the real time control of the digital computer 41.

Referring now to FIG. 3, the overall method of the present embodiment as implemented by the real time computer program of digital computer 41 is ilustrated in a macro flow chart. Details of this overall method will be discussed subsequently with respect to the other flow charting figures. Generally, the examination is started by the operator when the input test data is supplied, for example, in card form, to a card reader comprising a portion of the computer data input circuits 42 of FIG. 1. This procedure may be abbreviated by using input from disc or magnetic tape. The initial test patterns loaded may be freely chosen by the examiner on the basis or prior testing, clinical suspicion or other grounds. The system input circuits 53 of FIG. 1 having been previously set to the desired conditions for the test, the computer 41 is placed in operation and performs the visual field examination under control of the program. The first step in the program as indicated in block 61 of FIG. 3, is to call an initialization subprogram which reads the input data, discovers which eye is being tested and adapts the input test point sequence to the particular eye. At this point it is possible as indicated in block 62 to discover operator and/or subject induced errors. In this case an error message is written as indicated at box 63 and the program awaits correction of the error then loops back to block 61.

Assuming that the input data has been adapted to the eye being tested, a test point is selected at random from the test point array. The selected test point, as will be explained subsequently, is kept in computer memory in visual field coordinates. That is to say its coordinates are sotred relative to the direction of gaze of the patient. Based upon the input from the fixation monitoring device 56, which may be of either of the two types previously described, the program then determines at block 66 whether the operator has decided via the switches 30 and system data input circuits 53 to have the programs control the fixation monitoring. If the program control option has been executed the inputs from the fixation monitor 56 are used at block 67 to translate the test field coordinates to screen coordinates. It should be appreciated that block 67 actually represents a tight loop where the computer continuously monitors eye position while a test point is being presented and alters the test point's position on the screen to compensate for any eye movement during the test. This loop is exited on a time-out, a patient response, or an error condition. It should be further noted here that it is possible at this point to exit the program if the direction of gaze has wandered so far that it would jeopardize the validity of the visual field examination. An example of this would be if the gaze wandered sufficiently far from the center of the screen to preclude truly random presentation of stimuli. It is for this reason that it is most practical to require that the gaze remain within 10° of the center of the screen. This is indicated in FIG. 3 by the dotted lead line and exit 68. Assuming no further problem with fixation, the remainder of the program function will be described generally.

Test points are repetitively presented from the input data array until all test point thresholds have been determined. When all test point thresholds have been determined a data output program is called as indicated at block 65 and the test is complete. A program option which may be controlled, for example, by the switches 30 discussed previously, is a map of the patient's normal blind spot. Each normal eye has a generally elliptically shaped blind spot. The right eye blind spot is to the right of the fixation point and the left eye blind spot is to the left of the fixation point. If, as decided at block 69 the blind spot is being mapped, at block 70, a subprogram is called which performs a test on a single point in the blind spot area. Subsequent points in the blind spot area are randomly intermingled with points in the preselected test array to reduce patient anxiety. Assuming that the blind spot map is finished or that this option is not desired, the decision at block 69 is no, and a stimulus from the visual field array is then applied to the patient by calling a subprogram as indicated at block 71. This subprogram (to be discussed in more detail subsequently) applies the test point data via the previously discussed external equipment to the subject and registers his response.

Another subprogram which interprets the patient's response to the test stimuli is called as indicated at block 72. If the patient's response was affirmative or is interpreted to be correct, the data is modified to indicate the spot was seen, as indicated at block 73. If the subject's response was incorrect or if he did not respond within the allotted time, then the program performs the appropriate modification of the test point data to indicate the spot was missed as indicated at block 74. In either event the program continues to block 75 where it is determined if a threshold has been reached. If so, this data point is removed from the test (block 76) and placed in an output buffer for later display. The program then loops back to continue the testing sequence by selecting a new test pont from the test array at block 64. Finally, as stated previously, when all test points have been exhausted the visual field examination is complete. Also, preset logic may automatically add and test additional test points if the visual field deviates from expected values or shows specific internal inconsistencies. At this point the visual field data output is provided to the examiner in a desired format.

Referring now to FIGS. 4 and 5, the functioning of the initialization subprogram called in block 61 of FIG. 3 is described in more detail. As previously stated, an array of test points is entered to the system by the operator by placing input data into the computer data input circuits 42 of FIG. 1. This input data comprises a plurality of (selectively) distributed test points and predicted threshold brightness values for each point. The points are presented in test field coordinates or coordinates chosen relative to the direction of gaze. As the direction of gaze moves, corrections can be made to the test screen coordinates as will be described. As many test points as desired may be used, however, it has been found that about 200 test points can provide as detailed a visual field map with isopter lines as is normally desired. For other purposes,, such as a quick driver's license screening test, as few as 10 or 15 test points will suffice. In any case, input of test point data is the first step in conducting the visual field test.

The test point data may be in the format shown in FIG. 4, if desired. In FIG. 4, the data for each test point is compressed into segments of 24 bit lengths. In the example of FIG. 4 the first 6 bits on the left end of the computer words of the test point array comprise the X coordinate on the face of the cathode ray tube of the test point. The second 6 bits of the word provide the Y coordinate. This implies that the face of the test screen or cathode ray tube is divided into a 64 × 64 grid upon which test points may be presented. It will be appreciated by those skilled in the art, of course, that, if desired, a computer having a word length of 24 bits could be utilized, or if the word length of the computer is less than 24 bits, such as 16, the data can be spread over two or more words. Also, the number of binary digits or bits for each datum input could be changed. For example, a 256 × 256 grid could be provided for by using 8 bits for the X-Y coordinate data. This would provide greater registry precision for the test point data than the 6 bit data allows. It has, however, been found through experience that a 64 × 64 array is suitable for performing methods of the present invention.

Returning to the example of FIG. 4, the last 8 bits of each 24 bit computer word are occupied by two 4 bit numbers, the B number and the D number whose use will be described subsequently. It will suffice to say at this time the B number represents the highest stimulus value which can be tested or which has been tested, and the D number represents the lowest stimulus value which can be tested or which has been tested. The intensity data, which is also 4 bits in length, is initially set to a predicted threshold stimulus value and is supplied via intensity control register 46 and its associated digital-to-analog converter 47 to the intensity control circuits 45. It is thus possible to obtain any of 16 predetermined intensity settings from the 4 bit number.

When the test point array appears in memory, as indicated at block 201, the initialization program shown in flow chart form in FIG. 5 selects a test point in relative coordinates which is predicted to be in the normal blind spot area of the right eye as indicated at block 202. By applying a test point of a predetermined maximum brightness level in the area where the right eye blind spot should be, the subject's response or lack of response allows a machine decision to be made, determining which eye is being tested. At block 203 a test is performed to determine if the operator has elected to use the program's fixation point monitor of if external analog devices to be subsequently described are automatically performing this function. If the program is selected to perform this program then, as indicated at block 204, the subprogram for so doing is called and the right eye blind spot coordinate translated to account for the patient's change of fixation if any.

Assuming the fixation is satisfactory, then at block 205 an initialization subprogram, which will be described subsequently, is called to perform the function of interfacing the computer 41 with the external equipment for the presentation of a test point. The initialization program passes an indicator which indicates whether the patient responded to the stimulus presented. If the subject did respond to the stimulus, as indicated by blocks 206 and 207, it is necessary to modify the input data slightly, as indicated at block 208 of FIG. 5. If the subject did not respond to the stimulus the program presumes that the right eye is being tested as the test spot is generated in the position where the right eye blind spot should be. Operator error, malorientation of the patient or presence of a visual field defect which overlaps the blind spot of the other eye can be determined by providing an additional test point in the area where the blind spot of the left eye should be.

The input data modification is required since the format of the original input data is usually chosen to be for coordinates relative to the fixation point for the right eye and a typical test pattern is usually chosen to omit testing in area of the blind spot. In accordance with the present embodiment of the invention, a separate subprogram is called for testing the normal blind spot. Thus a coordinate transformation amounting to a reflection about the vertical axis through the fixation point is necessary to change the input data to a form suitable for mapping the visual field of the left eye. When this is done at block 208, the subprogram exits. The main program's next action is, as indicated at block 64 of FIG. 3, to select a test point for presentation to the subject.

Referring now to FIG. 19 the flow chart of the subprogram for monitoring the direction of gaze of the subject, if this option is chosen, and for either changing the screen coordinates of a selected test point if the direction of gaze varies within acceptable limits or for terminating the test, if desired, is shown. It should be noted that it is possible for the subject's direction of gaze to vary on the screen in such a manner that some points in the test field would fall off the screen, points in areas (1,1), (1,2), (2,1) or (2,2) of FIG. 13B. Obviously, such points cannot be presented in their otherwise pseudo randomly occurring manner. As it is possible for such non-randomness to impair the results of the visual field test in the opinion of some authorities, the present invention provides the option by switch selection on the panel 30 of FIG. 2 and system data input circuits 53 of FIG. 1 to terminate the test or to write an error message and delay further testing until the subject's direction of gaze has been restored to within acceptable limits.

The test at block 290 of FIG. 19 determines whether any fixation point correction is required. The angle $\theta$ is chosen to be a suitable size to, for example, allow for measurement error. If no fixation correction is needed, the program exits to continue the visual field test without fixation compensation.

If, on the other hand, the direction of gaze has moved significantly the test at block 291 inquires as to the procedure to be followed. If the termination option is chosen, then at block 292 an error message is written on the output medium and the program halts until fixation is restored. If fixation correction is desired, the test field coordinates are translated by the required amount at block 293. If, as determined at block 294, the corrected coordinate is on the screen, the compensation is accomplished and the program exits. If the compensated point falls off the screen then block 295 inquires as to whether any further test points remain. If not, the program exits noting the error condition by writing a suitable message at block 296. If further points remain then, as indicated at block 297, a new test point is chosen from the pseudo random sequence and the coordinate translation again applied. In this manner the relative coordinates kept in the computer memory store may be adjusted under program control for shifting of direction of gaze within reasonable limits.

Additionally, in the apparatus of FIG. 20, the brightness of the computer commanded brightness signal can be varied to compensate for the relative size change of the test caused by the recentering of the fixation point. This simply involves changing the brightness of the test point upon recentering the fixation point so that the test point appears to the subject to be the same size as it was before the subject changed the direction of his gaze. Before describing that part of the circuitry of the FIG. 20 apparatus which provides the brightness compensation, the theory underlying the technique employed will be discussed.

On a perimeter, the stimulus value of a spot of a designated size and brightness is essentially independent of the screen position of the spot and thus, the following corrections are not necessary with such a device. This is due to the fact that the eye-to-spot distance remains essentially constant on such a device. A campimeter, however, does not have a constant eye-to-screen distance D and the stimulus value W varies as the solid angle subtended by the spot varies. Assuming the area A of the spot remains independent of position, this means that the stimulus on a campimeter will be a function of $1/D^2$. The stimulus value of a spot therefore varies in accordance with the equation $W = A/D^2$. Because of varying direction of gaze, a given position on the retina does not fall at the same screen position each time it is tested, and it is thus desirable to compensate for the inherent nonlinearities of the campimeter to render the threshold more meaningful and if eye movements are to be tolerated.

Let $A_0$ be the area of a stimulus at distance $D_0$ and let $A_1$ and $D_1$ be similarly defined. Then, since we desire that $W_1 = W_0$ and since $W = A/D^2$, it is easily shown that $A_1 = (D_1/D_0)^2 A_0$. Now, with respect to the display screen, let $d$ be the distance from the eye to the center of the screen along an axis perpendicular to the surface of the screen and E be the eccentricity of a particular test point from the center, i.e. the distance of the location of the test point on the screen from the center of the screen, so that $$D^2 = d^2 + E^2$$

Now, let $A_0$ be the area of a designated stimulus value of the test point at the distance $d$ and $A_1$ be the similarly defined at D. Then, from the above equations, $A_1 = (D/d)^2 A_0$ or $A_1 = [1+(E/d)^2]A_0.$ Next, let $$\Delta X = X - X_c$$

$$\Delta Y = Y - Y_c$$

where $X_c$ and $Y_c$ are the coordinates of the screen center and X and Y are the coordinates of test point. Then, $$E^2 = (\Delta X)^2 + (\Delta Y)^2$$

and $$A_1 = [\frac{d^2 + (\Delta X)^2 + (\Delta Y)^2}{d^2}] A_0$$

where the quantity in brackets is the desired compensation coefficient. The circuitry of the FIG. 20 apparatus for calculating the compensation coefficient will now be described.

Signals representing "the corrected test point" coordinates, X' and Y', are supplied by the adders 302 and 303 respectively to the subtractors 305 and 306. Simultaneously therewith, a reference voltage supply 308 supplies signals representing the screen center coordinates $X_c$ and $Y_c$ (which, of course, are constant for a particular test regime) to the subtractors 305 and 306 respectively. The screen center coordinates would be determined at the beginning of a test and the reference voltage supply 308 adjusted to apply the appropriate signals representing the coordinates. The screen center coordinates are subtracted from the corrected test point coordinates to obtain signals representing $\Delta X$ and $\Delta Y$ which are applied to multipliers 310 and 312 respectively. The multipliers multiply each applied signal by itself to obtain signals representing $(\Delta X)^2$ and $(\Delta Y)^2$. These signals are applied by the multipliers 310 and 312 to an adder 314 together with a signal from the reference voltage supply 308 representing the constant $d^2$. The adder 314 adds these signals and applies the resultant to a divider 316. The signal representing $d^2$ is also applied to the divider 316 which generates a signal representing $d^2$ is also applied to the divider 316 which generates a signal representing the compensation coefficient $d^2 + (\Delta X)^2 + (\Delta Y)^2/d^2$. This signal is applied to a multiplier 318 along with the application thereto of the reference area signal $A_0$ from the computer. These two signals are multiplied together by the multiplier 318 to obtain a compensated area signal $A_1$ which is applied to the CRT device 304.

It should be noted that the above-described operation for generating a compensated brightness signal and especially the use of $\theta_x$ and $\theta_y$ is sufficiently accurate only if the angle which the direction of gaze makes with a line normal to the center of the screen is about 10° or less so that the small-angle approximation of $\theta = \tan$-gent $\theta$ is valid. If compensation for a wider angle of gaze were desired, it would be necessary to include additional circuitry in the FIG. 20 apparatus to generate the necessary tangent functions. This circuitry would be inserted between the fixation monitoring device 301 and the adders 302 and 303 and could be of a type currently known in the art.

It is recognized that brightness of a spot (B) can be used interchangably with area of a spot (A), and that the relationship between these is $$B \cdot A^{0.8305} = \text{constant}.$$

Even if the fixation point is not recentered, the FIG. 20 apparatus provides brightness compensation to enable the campimetry equipment of FIG. 1 to appear to the subject as a perimeter, i.e. equipment with constant eye-to-screen distance. That is, signals representing the coordinates of the test point, X and Y, are supplied by the computer, via the adders 302 and 303 (which would add nothing to the signals since $\theta_x$ and $\theta_y$ would be of zero value) to the subtractors 305 and 306. Processing of the signal would then continue as discussed above to obtain the compensated brightness signal $B_1$.

Referring now to FIG. 6, the flow chart of the interface subprogram for presenting a test point to the subject is shown. It will be understood that the external equipment-computer interface can vary as the computer model or external equipment is changed. The particular sequence described here is presented as being illustrative of a particular interface between an IBM 1131 B computer and external equipment constructed for use therewith. The invention, however, is not limited to this configuration. In this flow chart some steps are executed by the programmed computer 41 of FIG. 1 and some steps are executed by the external circuitry such as the system control circuits 54 of FIG. 1. The steps indicated in solid boxes are performed by the external equipment. When the program is entered, it should be noted, as indicated at block 77, that the external equipment requires that any remaining time in the delay between stimuli presented be completed before the next stimulus can be presented to the subject at a new test point.

The coordinate data for the 6 bit X-Y coordinates and the 4 bit intensity data (i.e. stimulus strength) are presented to the external equipment as indicated at block 78 by presenting this data to 16 output lines and four control lines which are connected to the external equipment. Buffer registers on the external equipment are prepared to accept data when the computer 41 pulses a control line to clear the input buffers to the external equipment as indicated at block 79. The computer 41 then pulses another control line which loads the new data from the output lines into the buffers contained on the external equipment. These steps are performed as indicated at blocks 80 and 81 of FIG. 6.

Upon receipt of this data the external equipment initiates a 15 microsecond delay and then signals its receipt by an interrupt to the computer as indicated at blocks 82 and 83. When the program receives the interrupt signal, the computer applies a pulse to still another control line. This clears the joystick or external response media input buffer in the external hardware as indicated at blocks 84 and 85. This conditions the external equipment to provide a digitized response to the movement of the joystick when the subject signals that he has observed a spot or test stimulus. The pulse on this control line, as indicated in block 84, also causes the external hardware to start a "duration of spot" time delay and to cause the spot to appear at the desired X-Y coordinate and with the desired intensity on the CRT screen as indicated at block 86.

The last-mentioned control line pulse also arms the audible horn so that upon the subject's response by joystick deflection, a relatively high-pitched sound indicates that the subject has responded correctly to the stimulus presented him. It will, of course, be understood that at the speeds at which the digital computer and external circuitry makes a decision as to the acceptability of the response, the subject is not likely to hear this high-pitched horn sound indicating a successful observation if, a few milliseconds later, the program determines that his response has been inadequate or incorrect, and modifies the sound of the horn accordingly.

In any event the subject will either respond to the test stimulus if he sees it in some manner which may or may not be correct or acceptable or he will not respond if he does not observe the test stimulus. As indicated by the test block 87 of FIG. 6, if the subject does not respond before the "duration of spot" time delay runs its course then the external equipment automatically times out the spot and ceases to present this stimulus to the subject. This is indicated at block 88. A signal to the computer noting no response is provided at block 89 and the "time delay between spots" is started at block 90. It should be noted that the time delay between spots is variable and may be controlled by the operator through the use of the switches 30 of the input device 29 of FIG. 2 or may be automatically changed on the basis of the subject's reaction time.

The subject responds to a stimulus by moving the joystick in the general direction of the portion of the switch circuit corresponding to the sector of the screen in which he observes the spot. The response may or may not be correct depending upon the allowable error margin chosen for the test. This error margin is determined by the switch setting of switches 30 of the input device 29 of FIG. 2. A subject response is usually not precise, and may miss the correct direction by 45° or more. The switch circuit includes a plurality of switches, such as 28, t provide a like plurality of sectors of desired angle such as 12.86° which determines the number of adjacent sectors about the angular sector in which the stimulus is presented that will be accepted as being a correct response. The diode encoding matrix 50 of FIG. 1 is utilized to encode the switch sector information provided by the subject. A Gray code is used for this purpose. No two adjoining switch positions differ by more than one binary digit or bit from each other. This eliminates the possibility of a spurious response due to the simultaneous engagement of two switch contacts by the joystick. This assures a response accuracy of ±½ angular sector. A digital number representative of the sector in which the response was observed by the subject is thus entered into the response register 51.

Upon receipt of an interrupt as a result of closure of a joystick switch response register 51 is interrogated by the computer as indicated in block 91 of FIG. 6. Simultaneously the external hardware turns off the stimulus spot as indicated at block 92. Based on the known spot coordinates presented to the subject the program then computes at block 93, the angular sector where the subject's response should have been. If the response is not within the allowable number of error sectors of where it should have been (as indicated at block 94), a control line is pulsed (block 95) causing the pitch of the horn to change to a relatively lower sound indicating an incorrect response to the subject (block 96). This corresponds to the interpretive program of FIG. 3 (block 72).

The false response is noted and the program starts the time between spot delay cycle to prevent premature display of the next test point to the subject as indicated at block 97.

If the response was within the allowable number of error sectors of where it should have been, then the time between spots delay is started immediately as indicated at block 98, and the program exits to call the modification programs, as indicated at blocks 70 and 71 of the overall flow chart of FIG. 3 to interpret the patient's response to the test stimulus.

Referring now to FIG. 7, the subprogram to modify the data points based upon the subject's response to the stimulus (blocks 72, 73, 74 and 75 of FIG. 3) is illustrated in flow chart form. This program determines the next intensity of the test spot to be presented to the subject at the coordinates in question. The program also determines if the threshold level has been reached at this coordinate. If the threshold level has been reached, testing at the point in question is complete. An option which may be used if the threshold if too far removed from the predicted threshold is to retest the threshold at the particular point.

It has been found that if when a given stimulus is not seen the intensity of the stimulus next presented at that point is increased by 4 units, but if the given stimulus was seen the intensity of the next stimulus is reduced by 2 units, greatest efficiency is obtained. The steps just described are performed by the program as indicated at blocks 101, 102 and 103 of FIG. 7. The brightness limit B and the dimness limit D of a data point represent, at any given time, the supremum and the infinum of the set of stimulus values which have been tested at that point. The B numbers are initially set to the highest stimulus level to be used in the test and are then reduced during the testing process in accordance with the subject's responses. The D numbers are initially set at the lowest stimulus level to be used in the test and then increased during the testing process in accordance with the subject's responses. The numbers IBB referred to in blocks 102 and 103 of FIG. 7 is a predicted test value which will be used at the next test presentation at the coordinates if certain conditions as determined by the remainder of the program are satisfied.

In any event, the next step (as indicated at block 104) is to determine if the B limit of the test coordinate has yet been tested. If it has been tested, then the program determines (block 105) if the dimness limit has been previously tested. If both have been previously tested, the predicted value of IBB is set to the half-way point of the previously tested values (as indicated at block 106). This type of search may be termed a binary cut technique which may be shown mathematically to be very efficient. If the B limit had not been tested (block 104) a flag K is set equal to 1 to indicate this fact. If the dimness limit had not been previously tested the flag K is set to a different value (3) to indicate this fact and if both extrema have been previously tested the flag K is set to 2 indicating this fact. These steps are performed at blocks 107, 108 and 109 respectively.

Equipped with the information concerning the limit testing for brightness and dimness, the program logic can determine if the threshold has been reached. The absolute numerical difference between the brightness and dimness indicators B and D is either greater, equal to, or less than 1. This difference is an indication of whether the threshold has been reached. Such a test is performed at block 109 in FIG. 7 and corresponds to the entry to block 72 of FIG. 3. If the difference is greater than 1, it is apparent that the threshold has not yet been reached since the threshold is, as previously noted, defined as that value of brightness of the stimuli which when reduced by one step cannot be seen. On the other hand, if the B and D difference is exactly equal to 1 the threshold may or may not have been reached. It remains to be determined if the limits previously discussed have been tested in order to determine this fact. Such a test is performed at block 110 and if the brightness limit has not been previously tested or if both limits have not been previously tested as indicated by the value of the flag K then the threshold value has not yet been reached. Therefore, further testing for this point must be made to obtain the threshold. Using the newly computed brightness criteria (Intensity Data = IBB) (at block 111) the program exits to continue testing.

In the situation where the B—D difference is less than 1, a test is performed at block 112 of FIG. 7 to determine the value of the flag K. If the flag K is equal to either 2 or 3 then the threshold value has been reached. If the flag $K = 1$ it indicates that the brightness limit has not yet been tested and the brightness limit B is set to maximum +1 at block 118 to indicate that the maximum available brightness could not be seen. Thus the output scale of brightness values contains one extra number when compared to the scale of the test provided. In all three cases the threshold has been reached and a test is performed at block 113 to determine if the recheck option is called for. If no recheck is indicated then an immediate exit is made via block 114 in which the data for the test point is removed from the test array and stored in the output data array. If a recheck option is open a test is performed (at block 115) to determine if the recheck is necessary. This test compares the measured threshold with a predicted predetermined threshold based on the normal visual threshold. If this test fails, it is an indication that possibly some abnormality has taken place. Such a gross abnormality could indicate blinking in attention or momentary defocusing. The test point is set up for a recheck at block 116 by reinitialzing the data concerning the brightness and dimness limits. If no recheck is indicated and the threshold has been determined, then the test point is removed from the test array (at block 114) and its threshold data stored in the output array. In any event the program has, at this point in time, modified the test point in response to the subject's response in a manner to arrive closer to the threshold determination.

Referring now to FIGS. 8 and 8A, the logic flow for the blind spot mapping subprogram is shown. A normal blind spot is illustrated schematically in FIG. 9. The blind spot map is a program option which may be controlled by the switches comprising the system data input circuit 53 of FIG. 1. Before discussing the details of the logic of FIG. 8, a general statement of the manner in which the blind spot map is performed will be of assistance in following the program logic. It is assumed initially by the program that the retinal or relative coordinates geometrical center of the blind spot is known. Test stimuli are then presented to the subject at approximately 1° arc increments along a ray (Ray 1) directed from the supposed center until the right edge of the blind spot is encountered. It will be noted that the order of test shown in FIG. 9 is the order of test used for mapping the blind spot border. The test used for mapping the blind spot is preferably interposed with the pseudo-random test stimuli used elsewhere, with an array of one blind spot test for each two of the others, but in a random manner. The left edge of the blind spot is determined in a similar fashion by Ray 2. The perpendicular bisector of the line joining the two horizontal edges of the blind spot is then computed. Tests points are presented at approximately 1° arc increments vertically downward along a Ray 3 directed along this bisector until the bottom edge of the blind spot is encountered. Test points are then presented at approximately 1° arc intervals upwardly in a vertical direction along the Ray 4 until the upper edge of the blind spot is encountered. Thus the upper and lower limits of a vertical chord through the blind spot are established. The perpendicular bisector of this chord passes through the geometrical center of the blind spot and may be referred to as the computed horizontal meridian of the blind spot. Test points are presented at approximately 1° arc increments (Rays 5 and 6) along the horizontal meridian to establish the true horizontal extent of the blind spot. With the horizontal extent and horizontal meridian established the center of the blind spot has then been determined with accuracy. A plurality of rays are then defined from the center of the blind spot to its edges at varying angles such as that shown by the dotted lines (Rays 7, 8, 9 and 10) labeled "representative later test ray". Test points may then be taken along these rays to determine the actual shape of the blind spot. As many such rays may be used as desired to determine the blind spot shape. Generally 8 or 10 rays are sufficient to complete a map of the blind spot to the desired degree of precision.

Referring now to FIG. 8, the logic flow of the blind spot mapping subprogram is shown in detail. Upon entry, a test is made at block 121 to determine if a new ray is to be tested or if this is the first entry into the program. If a new ray is to be tested or if this is the first entry into the subroutine, a second test is performed at block 122 to determine if all desired rays have been tested. If both these conditions are met then the blind spot map is finished. Further blind spot extent testing is suppressed by setting a flag (block 123), and the program exits.

If the blind spot test is still underway (as indicated by the test results of blocks 121 and 122) a new ray is chosen by the logic discussed above (block 125). A test point coordinate is computed in retinal coordinates at approximately a 1° arc increment along the ray (block 126). Of course before each test point is presented it is corrected for fixation point shift in the manner expressly discussed. If the computed test point coordinate extends off the edge of the visual field or into the fixation point it is apparent that an error has resulted or a large visual field defect exists. Such an error could be caused by a failure of the patient's focus or attentiveness. A test to determine this is performed (block 127) and if such an error has occurred blocks 128 and 129 indicate the remedy to be taken. The program then proceeds to point B of FIG. 8A.

If the computed test point is valid, it is presented to the subject (block 120) by calling the previously described joystick response and external equipment interface subprogram. Upon return from this program a test is performed (block 131) to determine if the spot was seen. If the spot was not seen it was in the blind spot and its coordinates are placed in the output array at block 132. In this case the program exits to continue the blind spot testing until all test rays are finished. If the spot was seen, it occurred just outside the edge of the blind spot and its coordinates are placed in the main test point array for an accurate threshold determination at block 133. It is also desirable that coordinates of a point two more steps out along the ray be placed in the main test point array for an accurate threshold determination. A flag is then set to indicate no more tests be performed on this ray (block 134) since the edge of the blind spot has been found along this ray. The program proceeds to B (shown in FIG. 8A).

At B (block 135) it is determined if both the horizontal and vertical meridians of the blind spot have been tested. If both meridians have been tested it is determined (block 136) if the actual center of the blind spot lies within an acceptable error margin from the predicted center. If the two centers do not correspond within acceptable limits a new horizontal meridian is computed based on the test data accumulated. The program logic previously discussed accomplishes this and the program exits to continue the blind spot test.

In the case where both horizontal and vertical meridians have been tested and where the actual center of the blind spot corresponds within acceptable limits to the predicted center, the program exits to continue the blind spot map. The blind spot map subprogram is complete when all rays have been tested.

It will be obvious to those skilled in the art that essentially the same process can be used for mapping disease scotomas which may be less dense than the normal blind spot. In such cases the brightness value of the test used for mapping the scotoma should be slightly dimmer than the threshold level in the scotoma. When mapping disease scotomas it is usually desirable to test along additional rays extending from rays of substantial length.

Referring now to FIGS. 10, 11 and 12 when the entire input array of test points have been examined and the threshold value of each determined, an output program whose logic flow is illustrated in FIG. 10 is called to record the data in usable form. A form which has been found to be particularly useful is a graphical plotter display. Such a graphical plotter may produce a complete visual field plot with isopters as shown in FIG. 12. The isopter lines connect visual field points having the same calculated threshold. On the other hand, a very short visual field display having only a few data points is sometimes desirable as shown in FIG. 11. This type of short visual field display is useful for such purposes as driver's license test or for a quick scan search for a visual defect or scotoma in a particular area of the visual field.

The program of FIG. 10 first determines (block 140) if there is a short visual field test to display. If such a plot is to be performed, (block 141) the data is plotted in the format shown in FIG. 11. Here the numbers indicate the threshold at each individual test point of the examination. A title is provided at the top of the display and the subject's name, date of the test, and other pertinent data are presented in a legend at the lower portion. For example, in the plot of FIG. 11, a typical legend might read that the angular arc covered by the circle is 5°. Of course, it will be apparent that if a large number of test points are used that this type display would be impractical because of cluttering.

If a short visual field test is not to be displayed, a test is made at block 144 to determine if a complete visual field with isopter display is to be done. If there is a complete visual field with isopters to be displayed a visual field map such as illustrated in FIG. 12 is drawn (block 145). A display of this type may be of substantial interest to the examiner to locate visual field abnormalities. This type display also may be utilized for interpreting or following the progress or treatment of a disease involving the visual system.

In FIG. 21, the system of another embodiment of the present invention is shown in block diagram form. This embodiment utilizes the kinetic method of visual field testing in which stimuli are moved inwardly from beyond the edge of the peripheral vision of the patient until the patient sees the stimuli. As with the static method, the patient is required to gaze at a fixation point while the stimuli are presented. Not only may the stimulus size and brightness be varied, as in the previous embodiment discussed, but also the velocity at which the stimulus is moved on the screen may be varied.

The FIG. 21 system includes all of the components of the FIG. 1 system except that the position control register 43 of FIG. 1 is identified as an initial position control register 43 in FIG. 21. The components common to FIG. 1 and FIG. 21 will be identified in FIG. 21 by the same numerals and other indicia used for FIG. 1. The operation of these components in the FIG. 21 system is the same as the operation in the FIG. 1 system and will not be described in any detail here.

The intensity control register 46 and the initial position control register 43 receive digital information from computer 41 regarding respectively the intensity of the test spot to be presented and the initial position on the face of the cathode ray tube 48 at which the spot will be presented. The FIG. 21 system further includes a velocity control register 350 which receives digital information from computer 41 defining the velocity, i.e. the speed and direction, at which the test spot will be moved. This information may be in the form of two digital numbers, the ratio of which defines the tangent of the angle (i.e., the slope) of the path to be traversed by the stimulus, and the absolute magnitude of which defines the speed at which the stimulus is to be moved. Also designated is the direction the test spot is to be moved on the path.

The contents of registers 43 and 46 are converted to analog form by digital-to-analog converters 44 and 47 respectively and applied to the deflection and intensity control circuits 45. Under control of the circuits 45, a test spot would be presented on the cathode ray tube face 48 at the position and having the intensity dictated by the contents of registers 43 and 46. The contents of the velocity control register 350 are also converted to analog form by a digital-to-analog converter 352 and applied to ramp generator circuits 354. These analog signals represent the horizontal and vertical components of the velocity. In response to these analog signals, each of the ramp generators 354 applies a varying analog signal to a corresponding one of adder circuits 356 and 358. The adder circuits 356 and 358 then sum corresponding analog signals from the ramp generator circuits 354 and digital-to-analog converter 44 and apply varying analog signals to appropriate deflection control circuitry 45. The deflection control circuitry 45 then causes the test spot to move on the face of the cathode ray tube 48 in the direction and at the speed determined by the signals received from the adder circuits 356 and 358 with the signal from adder circuit 356 determining the X component of the velocity and the signal from adder circuit 358 determining the Y component. The operation and electronics for moving a spot of light on the face of a cathode ray tube is, of course, well-known in the art.

Just as with the FIG. 1 system, if the subject changes his direction of gaze, the fixation point monitor 56 detects this change and signals the deflection control circuitry 45 to make an appropriate translation of the test field to compensate for this change.

When the test spot being presented on the cathode ray tube face moves into the field of view of the subject so that the subject perceives the test spot, the subject responds by moving the joystick contact to the sector or angular arc corresponding to the sector in the test field in which the spot was perceived. Upon movement of the joystick 49, a signal is applied to the computer 41 which signals the computer to stop further movement of and extinguish the test spot. The computer 41 then signals the ramp generators 354 to clamp the output signal of the generators at their current value. This stops further movement of the test spot. The output signals from the adder circuits 356 and 358 are converted to digital form by an analog-to-digital converter 360 and applied to the computer 41; this digital information identifies the coordinates in the test field at which the test spot was stopped. This information, together with similar information obtained from presenting other stimuli, may be used to map the isopters in a visual field plot. Each isopter would be determined by the locus of points at which a stimulus of a given instensity was perceived.

FIG. 22 graphically shows one method of performing a kinetic visual field test. The test field is divided by imaginary dotted lines 370 and 372 into four quadrants and the test is performed on a per-quadrant basis. The quadrants are labeled, beginning with the upper right-hand quadrant and proceeding counterclockwise around the field, I, II, III and IV. In the initial phase of the test, the test stimuli or spots are initially presented on a so-called starting circle 374, which is just outside the area one might expect the subject to perceive the stimulus. The stimuli are then moved toward the fixation point 376 of the test field. The paths traversed by the test spots in the initial phase of the test are referred to as basic rays, there being three such basic rays in each quadrant. Two of the basic rays in each quadrant, for example, rays 378 and 380 of quadrant II, extend from points on the starting circle 374 very near the two dividing lines bounding the quadrant. These basic rays are referred to as qaud external rays. Thus, the quad external ray 378 extends from a point on the starting circle 374 very near the vertical quadrant dividing line 372 toward the fixation point 376 to define a path over which a test spot would be moved. The quad external ray 380 defines a similar path. A quad external ray positioned on the other side of a quadrant dividing line from a first quad external ray is referred to as a fellow ray. The reason for the close spacing of the fellow rays is that they may be expected to lie just on opposite sides of the natural anatomic dividing lines of the visual field. Since a high percentage of clinically significant field defects occur in this area, testing in this area early in the course of the examination may be desirable. If tests are performed along the quadrant dividing line, small but significant offsets along these lines may not be detected.

In those embodiments of the inventiion in which the eye being tested is identified early in the examination, the horizontal fellow rays in the field to the side of the normal blind spot may be replaced by a single ray along the quadrant dividing line since no important anatomical divisions occur within this area.

The basic rays which are not quad external rays are referred to as quad internal rays, for example, ray 382 in quadrant II. Each of the four quad internal rays in the test field of FIG. 22 extend from the starting circle 374 along a path which divides the corresponding quadrant into equal parts.

In performing the visual field test, the test spots are moved from their initial positions on the starting circle 374 toward the fixation point 376 until the spots are perceived by the subject. The locations at which the test spots are perceived are then recorded, as previously discussed, for later use in constructing an isopter such as isopter 384 of FIG. 22. These locations are referred to as threshold points. In quadrant I of the test field of FIG. 22, for example, the three threshold points determined by moving a test spot successively along each of the three basic rays are 386, 388 and 390.

After the initial phase of a visual field test has been performed in which test stimuli are moved along the basic rays, additional rays are selected by determining the chords extending between previously determined adjaacent threshold points of a quadrant and then calculating the perpendicular bisectors of these chords. These perpendicular bisectors define additional rays along which test stimuli will be moved. In quadrant I of the test field of FIG. 22, a chord 392 is shown extending between threshold points 388 and 390. The perpendicular bisector or line segment (LS) of this chord is also shown. The beginning point of the ray LS could either be the starting circle 374 or, ot reduce testing time, some point fairly near the chord defining the ray LS but still outside the likely location of the threshold point. Ray LS in quadrant I of FIG. 22 is shown beginning about midway between the chord 392 and the starting circle 374 but any one of a number of different criteria could be employed to determine where to begin the ray LS.

The number of additional rays to be selected and tested is determined by the perimetric (about the perimeter) separation of threshold points in a quadrant, i.e., separation of adjacent threshold points. When the widest separation between threshold points in a quadrant is less than some predetermined amount, then the process of selecting additional rays for that quadrant is terminated.

A determination is also made as to whether the separation between threshold points on either side of a quadrant dividing line is greater than some predetermined amount. If it is not, then nothing further is done, otherwise a so-called inter-quad test is performed. In the test field of FIG. 22, the threshold points on either side of the quadrant dividing line between quadrants I and II, III and IV, and I and IV are all farily close and no interguad test would be performed for these pairs of points. However, the threshold points on either side of the quadrant dividing line between quadrants II and III are spaced some distance apart (because of the shape of the isopter near that quadrant dividing line) so that an inter-quad test would be performed. The inter-quad test, which will be discussed in greater detail later, includes the determination of the chord between the threshold points in question and the calculation of the perpendicular bisector thereof to define a ray along which a test spot will be moved.

The speed at which a particular stimulus is moved in the test field may be either fixed or variable and a stimulus may have either different fixed speed from one test to the next or different variable speeds. Since different subjects would have different reaction times, it may be desirable to select the speed for moving the stimulus based on the subject's reaction time. Thus, for a subject having a fast reaction time, the speed of moving the stimulus could be farily high and yet the stimulus could still be stopped sufficiently soon after perception by the subject such that there would be small error between the location of a stimulus when perceived and the location where stopped. For a subject having a slow reaction time, a slower speed would be desirable to minimize this error.

To compensate for the error between the location of the stimulus when perceived and the location where stopped (i.e. error due to reaction time of subject), a subject's reaction time might first be determined for use in determining locations of stimuli when perceived. The computer, having the location of a stimulus where stopped, the reaction time of a subject, and the velocity at which the particular stimulus was moved, could determine the location of the stimulus when perceived by the subject. The determination of reaction time could be done by presenting static stimuli to the subject and then calculating the time between presentation and reaction. Since subject factors, such as fatigue, affect reaction time, determinations of reaction times would be desirable at various times during the course of testing.

A variable speed for moving each stimulus might be desirable to improve the reliability of the test. Clinical experience dictates that more reliable responses occur at velocities which vary as a function of eccentricity from the fixation point, with the higher velocities occurring peripherally and the lower velocities occurring nearer the fixation point.

Although one particular method of tracing the rays for performing a visual field test has been described, numerous methods could be devised for selecting the rays. For example, all rays could originate an equal distance apart about the starting circle and be directed toward the fixation point. Also, the rays could be moved in directions other than toward the fixation point.

The isopter 384 of FIG. 22 defines a locus of threshold points determined for test stimuli having a fixed intensity or brightness level. Additional isopters would also be determined in the course of a visual field test using stimuli having different brightness levels. The result would be the mapping of a plurality of isopters formed, for example, as shown in FIG. 23A. The spacing between isopters there shown is generally uniform except for one portion of the two intermediate isopters indicated by the arrow 394. When a "bulge" such as that shown in FIG. 23A is discovered, a scotoma may be indicated. When a scotoma is suspected, a so-called inter-isopter test is initiated to determine if a scotoma does in fact exist. One illustrative inter-isopter test consists of sequentially presenting within the bulge a plurality of test spots arranged in a grid as shown in FIG. 23A, where each spot is spaced at least a distance of $Z/2$ from every other spot and from the two isopters between which the test is being performed. ($Z$ represents the threshold distance which must exist between adjacent isopters before an inter-isopter test is initiated.) The intensity of the spots presented might illustratively be the same as the intensity used to determine the outermost one of the pair of isopters in question. The arrangement of test spots in the bulge and the spacing of such spots, of course, is arbitary, the only criterion being that they should be arranged so as to be likely to detect a scotoma if one exists. If, when the spots are presented and any spot is not perceived by the subject, then the existence of a scotoma is established.

If the existence of a scotoma is established, then a scotoma test is performed. The purpose of a scotoma test is to determine the limits or the boundary of the scotoma. One method of performing such a test is graphically illustrated in FIG. 23B. The boundary of the scotoma is indicated by the kidney-shaped outline. A scotoma test in accordance with the present method commences by presenting and moving a test stimulus successively in four directions horizontally and vertically outward from one of the test points of the grid of test points used to establish the existence of the scotoma, i.e. one of the test points not seen by subject. Such a starting point is identified by the numeral 402 in FIG. 23B. The paths traversed by the spot of light moving outwardly from the starting point are referred to as principal rays, with rays 404, 406, 408 and 410 being the principal rays in FIG. 23B. The stimulus is moved along a principal ray until the stimulus is perceived by the subject. The location of the stimulus when the stimulus is perceived is referred to as a boundary point. After boundary points are determined at the intersection of the principal rays with the boundary of the scotoma, a chord between an adjacent pair of boundary points is determined and the perpendicular bisector of the chord calculated as earlier described for the normal visual field test. A stimulus is then moved outwardly along the perpendicular bisector or line segment LS from the intersection of LS with a principal ray until another boundary point is determined. This operation is performed for other adjacent boundary points until a sufficient number of boundary points has been determined. The starting point for the perpendicular bisectors, as described above, is a matter of choice and other starting points could be designated. The sufficiency of the number of boundary points might be established, for example, when the maximum perimetric distance between any pair of boundary points is less than some predetermined amount.

Calculation of the perpendicular bisectors or line segments LS for either the normal visual field test, the inter-quad test or the scotoma test will now be described in connection with FIG. 24. Assume that two threshold or boundary points 420 and 422 have been determined, and that (in the case of scotoma testing) a point 424 is some interior point, such as point 402 of FIG. 23B. This may also correspond to some calculated point, which is analogous to point $(X', Y')$ 426 of a prior test. In all cases, $L_0{}^1$ and $L_0{}^2$ are perpendicular. Now, in order to determine the equation which defines the line segment LS, the equations defining, in the coordinate system of the test field, the lines $L_0{}^1$ and $L_1{}^2$ of FIG. 24 must first be determined. For the line $L_0{}^1$, the following equation holds for any point $(X,Y)$ lying on $L_0{}^1$ where the coordinates $(X,Y)$ are coordinates in the coordinate system of the test field:

$$\frac{y - y_1}{x - x_1} = \frac{y_0 - y_1}{x_0 - x_1}.$$

Solving the above equation for $Y$, the following is obtained:

$$y = \left(\frac{y_0 - y_1}{x_0 - x_1}\right)(x - x_1) + y_1.$$

Let $M_0{}^1 = \left(\frac{y_0 - y_1}{x_0 - x_1}\right)$, and $B_0{}^1 = y_1 - M_0{}^1 x_1$, then $Y = M_0{}^1 X + B_0{}^1$ which is the equation for a straight line. By a similar analysis, the equation defining $L_0{}^2$ in the coordinate system of the test field may be shown to be $Y = M_0{}^2 X + B_0{}^1$. Similarly, the equation for the chord 428 is given by $Y = M_1{}^2 X + B_1{}^2$.

For lines to be perpendicular in a Cartesian coordinate system, the slope of one line must equal the negative of the recoprocal of the slope of the other line. The slope of the line LS of FIG. 24 is thus $M_s = -1/M_1{}^2 = X_1 - X_2/Y_2 - y_1$. The equation for LS is thus given by $Y - Y' = M_s(X - X')$. Substituting for $X' = X + X_2/2$ and $Y' = Y_1 + Y_2/2$ gives $Y - (Y_1 + Y_2/2) = M_s[X - (X_1 + X_2)]$.

Substituting for $M_s$ and solving gives the equation defining the line LS:

$$y = \left[\frac{x_2 - x_1}{y_1 - y_2}\right] x + \left[\frac{x_1{}^2 + y_1{}^2 - (x_2{}^2 + y_2{}^2)}{2(y_1 - y_2)}\right]$$

This equation defines the line LS in the coordinate system of the test field.

Recall that for scotoma tests, after the principal rays had been tested and the chord between a pair of boundary points determined, the perpendicular bisector of the chord was determined and then the stimulus was moved outwardly from the intersection of the principal ray and the perpendicular bisector. This intersection is shown as point 430, having coordinates $(X_s, Y_s)$ in FIG. 24. A determination of these coordinates in the coordinate system of the test field can be done using well-known techniques of analytical geometry and will not be described in detail here. Of course, such determination would only be made while testing for a scotoma and not while performing a normal visual field test or an inter-quad test. Other than this determination, the procedure for determining and testing along a perpendicular bisector of a chord is the same for the normal visual field test and the inter-quad test and for the scotoma test.

As indicated earlier, a stimulus is moved along a ray at some predetermined velocity which may either be fixed or variable. Knowing the velocity V at which a stimulus is to be moved along a ray defined by the equation $y = Mx + B$, where M and B are constants, then the vector components of the velocity in the $x$ and $y$ directions can be determined as follows.

First, differentiate the equation for the ray to obtain $dy/dt = M \, dx/dt$, since $dB/dt = 0$. Recognizing that $V_y = dy/dt$ and $V_x = dx/dt$, then $V_y = MV_x$. Since $V^2 = V_x^2 + V_y^2$, then $V^2 = V_x^2 + M^2V_x^2 = (1 + M^2) V_x^2$. This equation can be solved for $V_x$ to obtain $V_x = \sqrt{V^2/1 + M^2} = \sqrt{V/1 + M^2}$. By a similar analysis, the components of $V_y$ can be determined to be $V_Y = \sqrt{MV/1 + M^2}$. It should be recognized that the equations defining $V_x$ and $V_y$ above indicate that the direction of the velocity components is positive. A negative sign for $V_x$ and $V_Y$ would indicate movement in the reverse direction.

FIGS. 25A, 25B and 25C illustrate a flow chart of the kinetic method embodiment of the present invention. The process illustrated by this flow chart would be implemented on the system shown in FIG. 21. The first step in the process is to select the intensity or brightness level from the brightness level stack for the stimulus to be used in locating the isopter of interest (see block 502 of FIG. 25A). Normally a visual field test would begin using a test stimulus of near maximum brightness and then after the first isopter were mapped, the brightness would be successively decreased to locate other isopters.

After the brightness level is selected, the next step in the process (block 504) is to select a basic ray at random along which the test stimulus will be moved. The test stimulus is then moved along the ray from the starting circle toward the fixation point until the subject perceives the stimulus and thereby establishes a threshold point. The location of the threshold point is recorded (block 506) after which a determination is made as to whether the ray just tested is a quad external ray or a quad internal ray (block 506). If the ray is a quad external ray, a determination is then made (block 508) as to whether the fellow ray has been tested, and if it has not, the process moves to block 510. If the fellow ray has been tested, the process moves to block 512 where a determination is made as to whether the separation of threshold points of the ray in question and its fellow ray is significant. The "significane" of separation would be determined simply by comparing the distance between the threshold points with some predetermined distance and if the separation were greater than this distance, then the separation would be considered significant. If the separation is significant, a flag is set to indicate the need for performing a inter-quad test and the two threshold points in question are added to an inter-quad test point stack. The process then moves to block 510.

Returning to block 506, if it is determined that the ray in question is a quad internal ray, then a determination is made as to whether or not all basic rays have been tested (block 510) and if not the process returns to block 504. If all basic rays have been tested, then the program determines whether the inter-quad test flag is set (block 518). (The setting of the flag may have occurred at some earlier point in the processing after which the process could have retunred to block 518 via link A [shown in circle 516]).

If the inter-quad test flag is set, the program moves to block 520 of FIG. 25B where an inter-quad test program is called. The operation of the inter-quad test program will now be briefly described referring to FIG. 26. The first step in the inter-quad test program, as indicated by block 602, is the selection of an inter-quad area needing testing. If several inter-quad areas need testing, then one is selected at random. After selection of the area, that pair of points in the inter-quad area having the widest perimetric separation are selected (block 604). If this were the first call for the inter-quad program, this pair of points would be those threshold points encountered by tracing over fellow quad external rays. If the inter-quad program had previously been called, then points between these might be selected. After the points are selected, the perpendicular bisector LS of the chord joining the two points is calculated (as described previously) and a test spot is moved along LS (block 606). The point at which the test spot is initially presented for movement along LS, as indicated earlier, is a matter of choice but for the embodiment of the inter-quad program shown in FIG. 26, the starting point is on the starting circle on the same side of the inter-quadrant line as the threshold point closest to the fixation point. It is necessary to specify the particular intersection of the starting circle by LS where the test spot will be initially presented since LS intersects the starting circle in two places. After the test spot has been detected by the subject, the threshold point is recorded (block 606). The program then determines whether all threshold points in the inter-quad area are acceptably close and numerous (typically three points are required) (block 608) and if so, the inter-quad area is closed to further tests and the results (the threshold points determined) are stored (block 610). Whether or not the threshold points are acceptably close is determined simply by comparing the distance between the two points having the widest perimetric separation with some predetermined standard and if this distance is less than the standard, then all threshold points are considered acceptably close. If the program determines that all threshold points in the inter-quad area are not acceptably close, then the program returns to the main program and specifically to block 522 of FIG. 25B.

If, in clock 518, it had been determined that the inter-quad test flag was not set, then the process would have moved directly to block 522 of FIG. 25B bypassing the inter-quad test. In block 522, the program determines whether a scotoma test flag is set. If it is, then a scotoma test program is called (block 524).

A flow chart illustrating an illustrative scotoma test program is shown in FIG. 27. The first step of this program is to select a scotoma needing testing (block 620). If more than one scotoma needs testing, then a scotoma is selected at random. The program next selects a point from the scotoma test point stack to be the starting point of the scotoma test. As will be mentioned later, the scotoma test point stack includes data identifying, for each scotoma, all static test points used in an inter-isopter test to determine whether a scotoma existed. Recall that these test points were formed in an array spaced at least Z/2 distance from the other points of the grid and from the two isopters in question. An inter-isopter test program will be discussed later and this will become more clear then. After a point is selected from the scotoma test point stack, a determination is made as to whether all principal rays (of which there are four in number) have been tested for this point (block 624). If not, then a test stimulus is moved along an untested principal ray outwardly from the point selected in block 622 until a boundary point (the location at which the subject perceives the stimulus) is determined (block 626). This boundary point is recorded and the program then moves to block 632. If, in block 624, it is determined that all principal rays have been tested for the points in question, then that pair of boundary points having the widest perimetric separation is selected (block 628). The perpendicular bisector LS of the chord between the two points is then calculated and tested along and the boundary point determined in the test is recorded (block 630). As mentioned earlier, one way to test along the line LS is to begin moving the stimulus from the intersection of the line LS with that principal ray nearest the chord between the two points. Other methods, of course, could also be devised. After testing along the line LS, the program moves to block 632 where it is determined whether or not all boundary points are acceptably close. Again, the determination of whether the boundary points are acceptably close is made simply by determining if the distance between that pair of points having the widest perimetric separation is less than some predetermined standard. If the boundary points are all acceptably close, then a flag is set indicating that no more tests on this scotoma are to be made and the test results are stored (block 634). The scotoma test program then returns to the main program to block 526 of FIG. 25B. If it is determined that all boundary points are not acceptably close, then the scotoma test program returns directly to block 526.

After returning from the scotoma test program, a determination is made as to whether or not all threshold points on the isopter being tested are acceptably close (block 526 of FIG. 25B). This determination is similar to the one described for the inter-quad test program and the scotoma test program. If the threshold points are acceptably close, the process moves via link B (circle 528) to block 552 of FIG. 25C. If all threshold points are not acceptably close, then that pair of threshold points having the widest perimetric separation are selected (block 530). The perpendicular bisector LS of the chord joining the points is calculated and a test performed along LS and, upon perception of the test spot by the subject, the threshold point is recorded (block 532). Next, a decision is made as to whether or not a sufficient number of rays have been tested in the quadrant in which the previously calculated line LS is located (block 534). If not, the program returns via link A (circle 516) to block 518 of FIG. 25A. If a sufficient number of rays have been tested, the program marks the quadrant in question closed to this isopter test (block 536) and moves to block 538 of FIG. 25C. In block 538, a determination is made as to whether or not all quadrants have been tested and if not, the program again moves to block 518 of FIG. 25A, otherwise it moves to block 540. In block 540, the program determines whether a prior isopter has been tested and if it has, a determination is made (block 542) as to whether the maximum separation between the isopter presently being tested and this prior isopter is greater than some threshold distance Z (to be defined momentarily). If the maximum separation is greater than Z, then a determination is made as to whether the minimum separation between the present and prior isopter is less than Q (block 543). The distances Z and Q are predetermined to enable the identification of an inter-isopter area in which the likelihood of the existence of a scotoma is high. In other words, if the separation between isopters, such as the bulge shown in FIG. 23A, is suspiciously large, compared to the smallest separation then in all likelihood a scotoma exists.

If the maximum separation between the present and prior isopter is less than z (block 542) or if no prior isopter has been tested (block 540), then the program moves to block 544.

If the maximum separation between the present and a prior isopter is greater than z and the minimum separation is less than Q, then an inter-isopter static test program is called (block 546). An illustrative flow chart of one method of performing an inter-isopter test is shown in FIG. 28. The first step in this flow chart (block 640) is to calculate the coordinates of static points to test between the isopters in question such that the points are at leas Z/2 distance from each other and from the two isopters. an array of such points is graphically shown in FIG. 23A. After determining the static test points, the brightness level of the stimulus is set to the same level as that used to test for the outermost one of the isopters bounding the test area (block 642). A point is then selected and the stimulus applied to that point (block 644). If the stimulus was seen (block 648), the point is removed from the test array (block 650). If the stimulus was not seen, the point is placed in a list for use in a future scotoma test as indicated in block 652 and the process moves to block 650. After the static point tested has been removed from the test array, the process moves to block 646 where a determination is made as to whether or not the test array is empty. If it is not, the program moves again to block 644 and if it is, the program returns to the main program to block 548 of FIG. 25C.

If no scotomas were found in the inter-isopter test, then the program returns via link A (circle 516) to clock 518 of FIG. 25A. If the scotoma was found, the scotoma is verified (for example, by performing another inter-isopter test), a flag is set to indicate the need for a scotoma test, and the points presented in the inter-isopter test program which were not seen by the subject area added to a scotoma test point stack (block 550). The program then moves to block 544.

If the maximum separation between the present and prior isopter is greater than z and the minimum separation is not less than Q, then the need for platting an isopter between the present and prior isopter is indicated (because of the wide spacing therebetween), and the program moves to block 545. At block 545, a brightness level is selected which is intermediate the levels used for testing the present and prior isopter and placed in the brightness level stack. The program then moves to block 544.

The step indicated by block 544 includes the setting of a flag indicating completion of the test for the current isopter in question and initialization for the next isopter test (i.e., resetting counters, registers, etc. and selecting spot size, velocity, etc.). A decision is then made (block 552) as to whether or not all required normal, inter-quad and scotoma tests have been completed. (the designation "normal" test means those tests performed along basic and bisector rays to locate an isopter.). If all the required tests have not been completed, the program returns to block 518 of FIG. 25A otherwise the program moves to block 553. In block 553 a determination is made as to whether all brightness levels in the brightness level stack have been tested; if not, the program returns to block 502 via link C, otherwise the program exits.

FIG. 29 shows still another embodiment of the present invention in which the kinetic method of testing is utilized and in which a hemispherical screen such as that shown in FIG. 32 is used. Again, many of the components of FIG. 29 are the same as those of FIG. 1 and such components are numbered the same as they are numbered in FIG. 1. Additional components are included in the FIG. 29 system for operating the apparatus of FIG. 32 utilizing spherical coordinate calculations.

In a spherical coordinate system, there are three parameters or variables including the variable $\theta$ which designates a horizontal angular coordinate, $\phi$ which designates a vertical angular coordinate and $r$ which designates a radial coordinate. For the apparatus of FIG. 32, the subject will be positioned so that his eye is substantially the same distance from all portions of the hemispherical screen so that the coordinate $r$ is not a factor. The location of the test spot on the hemispherical screen is determined strictly by the coordinates $\theta$ and $\phi$. With this background, FIG. 29 will now be described.

The system of FIG. 29 includes a plurality of registers including a $\theta$ velocity control register 704 for receiving digital information from the computer 41 designating the $\theta$ component of velocity at which the test spot is to be moved, a $\phi$ velocity control register 706 for receiving digital information designating the $\phi$ component of the velocity, a spot size control register 708 for receiving digital information designating the size of the test spot, an intensity control register 709 for receiving information designating the intensity or brightness of the test spot, and a color control register 710 for receiving digital information designating the color of the test spot. Also included are a $\theta$ position control register 712 for receiving digital information from the computer 41 designating the initial $\theta$ coordinate at which the test spot is to be presented and a $\phi$ position control register 716 for receiving digital information designating the initial $\phi$ component at which the test spot is to be presented. A free running clock 726 provides output pulses to an AND gate 727 which is controlled by the computer 41 to selectively supply the clock pulses to two multiplier circuits 714 and 718. The multiplier circuits 714 and 718 multiply the frequency of the clock signal by an amount designated by the contents of corresponding velocity control registers 704 and 706. The resulting signals are applied to corresponding position registers 712 and 716.

The position registers 712 and 716 are simply up/down counters which either increment or decrement their count in response to each pulse received by a corresponding multiplier circuit. Whether or not a position register increases or decreases its count is determined by a sign bit stored in a corresponding velocity register. For example, if the sign bit is positive, then the corresponding position register counts up or increments its count with each pulse received by a multiplier circuit, and if the sign bit is negative, the position register counts down or decrements its count with each pulse received by a multiplier circuit.

The information stored in each of the velocity registers 704 and 706 is an integer from the ratio of the $\theta$ and $\phi$ velocity components. Thus, if the test spot is to be moved five increments in the $\theta$ direction for each increment in the $\phi$ direction, than a 5 would be stored in the $\theta$ velocity control register 704 and a 1 would be stored in the $\phi$ velocity control register 706. If the velocity of the test spot were to be twice that indicated by this ratio, then a 10 would be stored in the $\theta$ velocity control register 704 and a 2 would be stored in the $\phi$ velocity control register 706. Increasing the amount stored in the velocity registers results in a corresponding increase in the number of pulses produced by the multiplier circuits 714 and 718.

The count information in the $\theta$ position control register 712 and the $\phi$ position control register 716 is supplied to adder circuits 728 and 730 respectively which, if no information is stored in register 746 and 748, apply the count information to registers 732 and 734 respectively. The information in registers 732 and 734 identifies the instantaneous location of the test spot in terms of the $\theta$ and $\phi$ coordinates. This information is supplied to servo and control units 736 and 738 which control certain portions of display apparatus 740 to control the location of the test spot on the hemispherical screen. The servo and control units 736 and 738 are shown in detail in FIG. 30 and will be described later.

While the test is underway, the fixation point monitor 56 is monitoring the direction of gaze of the subject and supplying signals to two analog-to-digital converters 742 and 744 whenever a change in direction of gaze is detected. The signal supplied to the converter 742 indicates the $\theta$ component of the change in direction of gaze and the signal supplied to converter 744 indicates the $\phi$ component of the change in the direction of gaze. The digital information generated by the converters 742 and 744 is supplied to registers 746 and 748 respectively which makes this information available to adder circuits 728 and 730. The adder circuits 728 and 739 simply add the contents of respective registers 746 and 748 with the contents of respective ones of the position control registers 712 and 716. The resulting sums obtained identify a "translated" location for the test spot which takes into account the change in the direction of gaze of the subject. This operation, of course, is very similar to that described for the FIG. 1 system. The outputs of the adder circuits 728 and 730 are supplied to registers 732 and 734 respectively as previously described.

The information in the spot size control register 708, intensity control register 709, and color control register 710 are supplied directly to servo and control units 720, 722 and 724 respectively. The servo and control units respond by controlling certain of the display apparatus 740 to determine size, intensity and color of the spot presented on the screen. The servo and control units 720, 722 and 724 are identical in construction and are shown in detail in FIG. 30.

When the subject perceives a stimulus, he operates the joystick 49 causing a signal to be applied to the computer 41. The computer 41 then removes the enabling signal from the AND gate 727 and signals the $\theta$ position control register 712 and the $\phi$ position control register 716 to stop further counting (either up or down). The computer 41 then reads the contents of these registers which specifies the location at which the stimulus was stopped and extinguished.

A servo and control unit is shown in the dashed line rectangular box of FIG. 30 connected to a register 810, from which digital information is received, and to a servo motor 808 which is controlled by the unit 800. The information from the register 810 is applied to a digital comparator 804 and compared with digital information received from a shaft angle encoder 802. The information from the shaft angle enclnder 802 identifies the angular position of the drive shaft of the servo motor 808. If the angular position of the shaft of the servo motor 808 is the same so that designated by the information received from the register 810, then the digital comparator 804 produces no output signal. If the position of the drive shaft of the servo motor 808 is at a greater angle than that indicated by the information from register 810, then a signal is applied via lead 812 to an operational amplifier 806 which causes the servo motor 808 to reduce the angular position of its drive shaft by an amount indicated by the signal applied to lead 812. If the angular position of the drive shaft of the servo motor 808 is less than that indicated by the information from register 810, then the digital comparator 804 applies a signal via lead 814 to the operational amplifier 806 which causes the servo motor to increase the angular position of its drive shaft. In this manner, digital information is used to control the angular position of the drive shaft of a servo motor. Connection 816 designates a mechanical connection to the drive shaft of the servo motor 804 and connection 818 designates an electrical connection. The structure and operation of servo and control units such as that of FIG. 30 are well-known in the art.

Before describing the display apparatus 740 of FIG. 29, which is shown in detail in FIG. 32, the circuit of FIG. 31 will be described. The circuit of FIG. 31 provides for varying the velocity of a test spot as a function of the distance of the test spot from the fixation point. The circuitry shown in the box 828 may be combined with the FIG. 29 system by connecting to the clock 726, the $\theta$ position control register 712, and $\phi$ position control register 716. In operation, count information from the position control registers 712 and 716 are supplied to digital-to-analog converters 834 and 836 respectively and the resultant analog signals, which represent the $\theta$ and $\phi$ coordinates respectively of the location of the test spot, are supplied to multiplier circuits 838 and 840 respectively. The multiplier circuits simply multiply the signals together to obtain signals representing $\theta^2$ and $\phi^2$ which are applied to an adder circuit 842. The adder circuit 842 adds the signals together and supplies the result to a square root circuit 844. A signal is thus generated which represents $\sqrt{\theta^2 + \phi^2}$. As the coordinates of the test spot change, then of course the magnitude of this signal changes. Assuming a switch 846 is in the closed position, this signal is supplied to an adder circuit 848. Also supplied to the adder circuit is a signal generated by a base velocity circuit 850 representing a manually selectable base velocity. The magnitude of this signal determines a socalled base velocity and this magnitude may be varied by a control knob 852. The base velocity circuit 850 might illustratively be a voltage generator. The base velocity is the minimum velocity at which the test spot will be moved regardless of the distance of the test spot from the fixation point.

The signals from the square root circuit 844 and the base velocity circuit 850 are added by the adder circuit 848 and supplied to the clock 726 to control the frequency of the output signal of the clock. The greater the signal from the adder 848, the greater would be the clock pulse frequency. Recall from the description of FIG. 29 that the greater the clock pulse frequency, the greater is the velocity of the test spot. Thus, the FIG. 31 circuit provides for decreasing the velocity of the test spot as the test spot approaches the fixation point (whose coordinates are $\theta = 0$ and $\phi = 0$) and vice versa. Thus, if the test spot passed directly over the fixation point so that the signal from the square root circuit 844 were substantially zero, a signal from the base velocity circuit 850 would still be supplied to the adder 848 and thus to the clock 726 to maintain a certain minimum velocity for the test spot.

If it is desired that the test spot be moved a fixed velocity, then the switch 846 could be opened and only the signal from the base velocity circuit 850 would be applied to the adder 848. A signal of fixed magnitude would thus be supplied to the clock 726.

FIG. 32 depicts display apparatus for use with the FIG. 29 system. This apparatus includes a hemispherical screen 902 on which a test spot 904 is presented. A subject 906 is positioned so that the eye being tested is substantially the same distance from all portions of the screen. Note that no mask member or eye piece are shown in FIG. 32 as they are in FIG. 2 although such apparatus would be present. Also note that the equipment for monitoring the direction of gaze of the subject is not shown in FIG. 32 but, again, such equipment would be utilized.

A plurality of servo motors 908, 910, 912, 914 and 916 control various components of the display apparatus. Each such servo motor would be connected to a corresponding one of the servo and control circuits described in connection with FIG. 29. Servo motor 908 controls the angular positioning of a brightness filter wheel 920. The filter wheel 920 includes a plurality of segments angularly spaced for determining the brightness of a beam of light passing therethrough. Such beam of light is designated as 922 and originates from a light source 924. A reflector 926 is positioned behind the light source 924 to direct more of the light along the path 922. A pair of lenses 928 are provided to focus and guide the light to the filter wheel 920.

Servo motor 910 controls the angular positioning of a color filter wheel 930 which determines the color of the test spot presented on the test screen. The color filter wheel 930 is rotated by the servo motor 10 to various positions so that a color filter is placed in the path of the light beam 922 to filter all but the desired color of light from the beam.

Servo motor 912 controls the angular positioning of a diaphragm wheel 932 to determine the size of the test spot. The diaphragm wheel 932 includes a plurality of different size holes spaced about the periphery of the wheel and when a particular spot size is desired, the servo motor 912 rotates the wheel 932 until the hole corresponding to the desired size is positioned in the path of the beam of light 922. The holes shown in FIG.

32 are much larger (relatively) than they would be in actual practice but are shown in that size to illustrate the principle involved.

Two mirrors 936 and 940 guide the light onto the test screen 902 as generally indicated by the dotted line 941. The mirror 936 is mounted in a fixed position to direct the beam downwardly toward mirror 940. Mirror 940 is mounted to rotate about two perpendicular axes lying in the plane of the mirror. In this manner the test spot 904 can be displayed at substantially any location on the test screen 902. Two servo motors 914 and 916 control rotation of the mirror 940 about each of the two axes-- one representing the $\theta$ coordinate and the other representing the $\phi$ coordinate. Structure for enabling rotation in 2° of freedom is well known.

As with the FIG. 2 apparatus, the subject 906 responds to the presentation of the test spot by operating a joystick 952 as previously described. This response is recorded and additional test spots are presented.

Although the invention has been described with reference to particular referred embodiments thereof, many changes and modifications will become apparent to those skilled in the art in view of the foregoing description which is intended to be illustrative and not limiting of the invention defined in the appended claims.

What is claimed is:

1. An automatic machine implemented process for testing the visual field of a subject comprising the steps of:
establishing a test field positioned relative to a predetermined point on a test screen;
determining, under machine control, the instantaneous location of the direction of gaze of the subject relative to the predetermined point;
translating the test field relative to the predetermined point on the test screen when the direction of gaze is not at said predetermined point to reposition the test field relative to the direction of gaze the same as the position of the test field relative to said predetermined point when the test field was initially established;
presenting, on the test screen, under machine control, test stimuli of selected stimulus value at preselected locations in the test field; and
determining whether the subject percieved the test stimuli.

2. A process as in claim 1 wherein said test stimuli are presented under machine control in a sequence not predictable by the subject.

3. A process as in claim 1 further including the steps of supplying an indication of correct perception to the subject if the subject correctly perceives a test stimulus and supplying an indication of incorrect perception if the subject incorrectly indicates perception of the stimulus.

4. A process as in claim 1 wherein the subject indicates perception of a stimulus by operating a manual device.

5. A process as in claim 1 wherein a determination that the subject perceived a stimulus is made by monitoring a change in the evoked cortical potentials in the occipital center.

6. A process as in claim 1 wherein a determination that the subject perceived a stimulus is made by detecting movement of the subject's eye in the direction of the test location at which the stimulus was perceived.

7. A process as in claim 1 wherein a determination that the subject perceived a stimulus is made by monitoring a change in the diameter of the pupil.

8. A process as in claim 1 wherein said test stimuli are spots of light presented at selected test locations which are stationary in said test field.

9. A process as in claim 8 further including the steps of presenting, under machine control, additional momentary spots of light of varying stimulus value at said selected test locations, and determining the stimulus values at which the particular spots of light are perceived by the subject.

10. A process as in claim 9 wherein the stimulus value of an additional momentary spot of light to be presented at a particular test location is computed in response to the subject's history of perception response at the test location in question, such that the threshold value of stimulus perceived at each selected test location in the test field is detected.

11. A process as in claim 8 further including the step of displaying under machine control, the threshold value of the stimulus at each selected location.

12. A process as in claim 1 wherein the step of determining, under machine control, the instantaneous location of the direction of gaze of a subject is performed by monitoring the relative location, on an image of the eye pupil, of the image of a point source of radiation.

13. A process as in claim 12 wherein the point source of radiation is located effectively at infinity.

14. A process as in claim 1 wherein the step of determining, under machine control, the instantaneous location of the direction of gaze of a subject is performed by monitoring the changes in the horizontal and vertical components of the electric field surrounding the eyeball caused by the shifting corneo-retinal standing potential.

15. A process as in claim 1 and further including the initial step, prior to commencing the initial determination of the subject's instantaneous location of direction of gaze, of subjectively obtaining a refractive correction of the eye of the subject.

16. A process as in claim 1 and further including the initial steps of determing, under machine control, which eye of the subject is being tested and selecting, in response to such determination, the pattern of presenting said test stimuli.

17. A process as in claim 1 wherein translating the test field is performed by applying a pure translation to preselected test point coordinates having a fixed coordinate location relative to the direction of gaze of the subject.

18. A process as in claim 17 wherein the test screen is planar and further including the step of modifying the stimulus value of the test stimuli in accordance with the amount and direction of translation of the test point coordinates.

19. A process as in claim 18 wherein said test stimuli are spots of light and said modifying step comprises computing the stimulus value $B_1$ of a spot of light at a translated test point in accordance with the expression $$B_1 = [\frac{d^2 + (\Delta X)^2 + (\Delta Y)^2}{d^2}] B_0$$

where $d$ is the distance from the subject's eye to the center of the test screen along an axis perpendicular to the surface of the screen, $B_0$ is a predetermined reference stimulus value, and $(\Delta X)^2 + (\Delta Y)^2$ is the square of the distance from the center of the test screen to the location of the translated test point.

20. A process as in claim 1 further including the step of communicating an alarm signal and ceasing presentation of said test stimuli if the location of the subject's direction of gaze deviates by a preselected limiting amount from said predetermined point in said test field.

21. A process as in claim 20 further including the step of resuming the presentation of said test stimuli when the direction of gaze of the subject returns to within said preselected limiting amount from the reference point in said test field.

22. A process as in claim 1 wherein said test stimuli are each initially presented at a selected location on said test field and then moved, relative to the test field and under machine control, in a certain direction.

23. A process as in claiam 22 wherein said test stimuli are spots of light and further including the step of determining when the subject perceives each spot of light.

24. A process as in claim 23 wherein said spots of light are each initially presented at a location on the test field which is outside the visual field of the subject and then moved toward the visual field until the subject perceives the spot.

25. A process as in claim 24 wherein the speed at which the spots of light are moved is varied as a function of eccentricity from the fixation spot.

26. A process as in claim 24 further including the step of determining the location on the test field at which the subject perceives each spot of light.

27. A process as in claim 23 wherein the location determining step includes the steps of:
the subject indicating perception of a spot of light by operating a manual device,
stopping movement of the perceived spot in response to the operation of the manual device, and
determining the location on the test field where the spot was stopped.

28. A process as in claim 27, further including the step of determining an adjusted location on a path over which a spot of light moved prior to being stopped, the distance of said adjusted location from the location at which the spot was stopped being a function of the speed of movement of the spot multiplied by the reaction time of the subject.

29. A process as in claim 23 wherin said spots of light are initially presented at spaced locations about the perimeter of the test field and then moved toward the location on the test screen of the direction of gaze of the subject.

30. A process as in claim 29 wherein spots of light are initially presented at locations about the perimeter of the test field on either side of imaginary vertical and horizontal lines which divide the test field into four quadrants.

31. A process as in claim 29 further including the steps of
a. determining, for two spots of light which move along adjacent paths, the locations at which the two spots are perceived by the subject, and
b. presenting and moving another spot of light in a path which is substantially perpendicular to a chord extending between the two locations.

32. A process as in claim 31 wherein the perpendicular path is commenced a predetermined distance from the chord toward the perimeter of the test field and a spot of light is moved from the point of commencement toward the chord.

33. A process as in claim 31 wherein steps (a) and (b) are repeated for each pair of spots of light which move along adjacent paths until the locations at which each such pair are perceived by the subject are within a predetermined distance of each other.

34. A process as in claim 23 wherein said spots of light are each initially presented at a location on the test field within a previously detected scotoma of the subject and then moved consecutively in a plurality of directions from the location until the subject perceives the spot of light.

35. A process as in claim 34 wherein the spots of light are moved consecutively in four directions from the location, each of said four directions being oriented at least 90° from the other directions.

36. A process as in claim 35 further including the step of determining the location on the test field at which the subject perceives each spot of light.

37. A process as in claim 36 further including the steps of determining, for two spots of light which move along adjacent paths, the locations at which the two spots are perceived by the subject, and presenting and moving another spot of light in a path which intersects substantially at a right angle a chord extending between the two locations and which commences on one of the paths traversed by one of the previously moved spots of light.

38. A process as in claim 22 wherein said spots of light are presented on a planar screen and moved in accordance with velocities defined in terms of a Cartesian coordinate system.

39. A process as in claim 22 wherein said spots of light are presented on a hemispherical screen and moved in accordance with velocities defined in terms of a spherical coordinate system.

* * * * *